United States Patent
Jensen

(10) Patent No.: US 7,570,187 B2
(45) Date of Patent: Aug. 4, 2009

(54) TECHNIQUE FOR IMPROVING MODULATION PERFORMANCE OF TRANSLATIONAL LOOP RF TRANSMITTERS

(75) Inventor: Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 101 days.

(21) Appl. No.: 11/324,362

(22) Filed: Jan. 3, 2006

(65) Prior Publication Data

US 2006/0109155 A1 May 25, 2006

Related U.S. Application Data

(63) Continuation of application No. 10/676,221, filed on Sep. 30, 2003, now Pat. No. 7,027,780.

(51) Int. Cl.
*H03M 1/66* (2006.01)
(52) U.S. Cl. ........................ 341/144; 455/118; 375/297; 330/53
(58) Field of Classification Search ......... 341/100–170; 330/2, 10, 53, 207, 147; 375/297, 197, 229; 455/108, 118, 552.1, 127.1
See application file for complete search history.

(56) References Cited

U.S. PATENT DOCUMENTS

| | | | | |
|---|---|---|---|---|
| 5,579,342 | A | * | 11/1996 | Crozier ........................ 375/296 |
| 5,638,404 | A | * | 6/1997 | Crozier ........................ 375/296 |
| 7,027,780 | B2 | * | 4/2006 | Jensen .......................... 455/91 |
| 7,378,902 | B2 | * | 5/2008 | Sorrells et al. ................. 330/2 |
| 7,414,469 | B2 | * | 8/2008 | Sorrells et al. .......... 330/124 R |

* cited by examiner

*Primary Examiner*—Lam T Mai
(74) *Attorney, Agent, or Firm*—Garlick Harrison & Markison; James A. Harrison

(57) ABSTRACT

A transmit signal generated by the baseband processor in a translational loop type RF transmitter is "pre-distorted" so as to counter act magnitude distortion and group delay variation imposed by a narrow PLL signal filter. The pre-distortion occurs in two steps: a magnitude equalizer in the baseband processor pre-distorts the amplitude of the transmit signal according to the inverse of the PLL signal filter magnitude response, and a group delay equalizer linearizes the phase response of the entire transmitter chain, i.e., pre-distorts the transmit signal such that the combined phase response of magnitude equalizer, group delay equalizer, and PLL signal filter is linear. With such pre-distortion, a loop filter is provided for with component values that define a relatively small bandwidth for the loop filter to filter spurious tones that result from an IF reference feedthrough to a voltage controlled oscillator of the translational loop.

20 Claims, 25 Drawing Sheets

| Frequency Offset → <br> MS TX Power: ≥36 dBm | 100k | 200k | 250k | 400k | >600k <1800k |
|---|---|---|---|---|---|
| 34 dBm | +0.5 | -30 | -33 | -60 | -60 |
| 32 dBm | +0.5 | -30 | -33 | -60 | -60 |
| 30 dBm | +0.5 | -30 | -33 | -60 | -60 |

| Frequency Band | Max. Emission | Frequency Band (MHz) | Max. Emission |
|---|---|---|---|
| 450-458 | -38 | 460-468 | -67 |
| 478-486 | -38 | 489-496 | -67 |
| 824-849 | -38 | 869-894 | -79 |
| 880-915 | -38 | 921-925 | -60 |
| 925-935 | -67 | 935-960 | -79 |
| 1710-1785 | -42 | 1805-1880 | -71 |
| 1850-1910 | -43 | 1900-1930 | -66 |
| 1930-1990 | -71 | 2010-2025 | -66 |
| 2110-2170 | -66 | | |

Figure 13

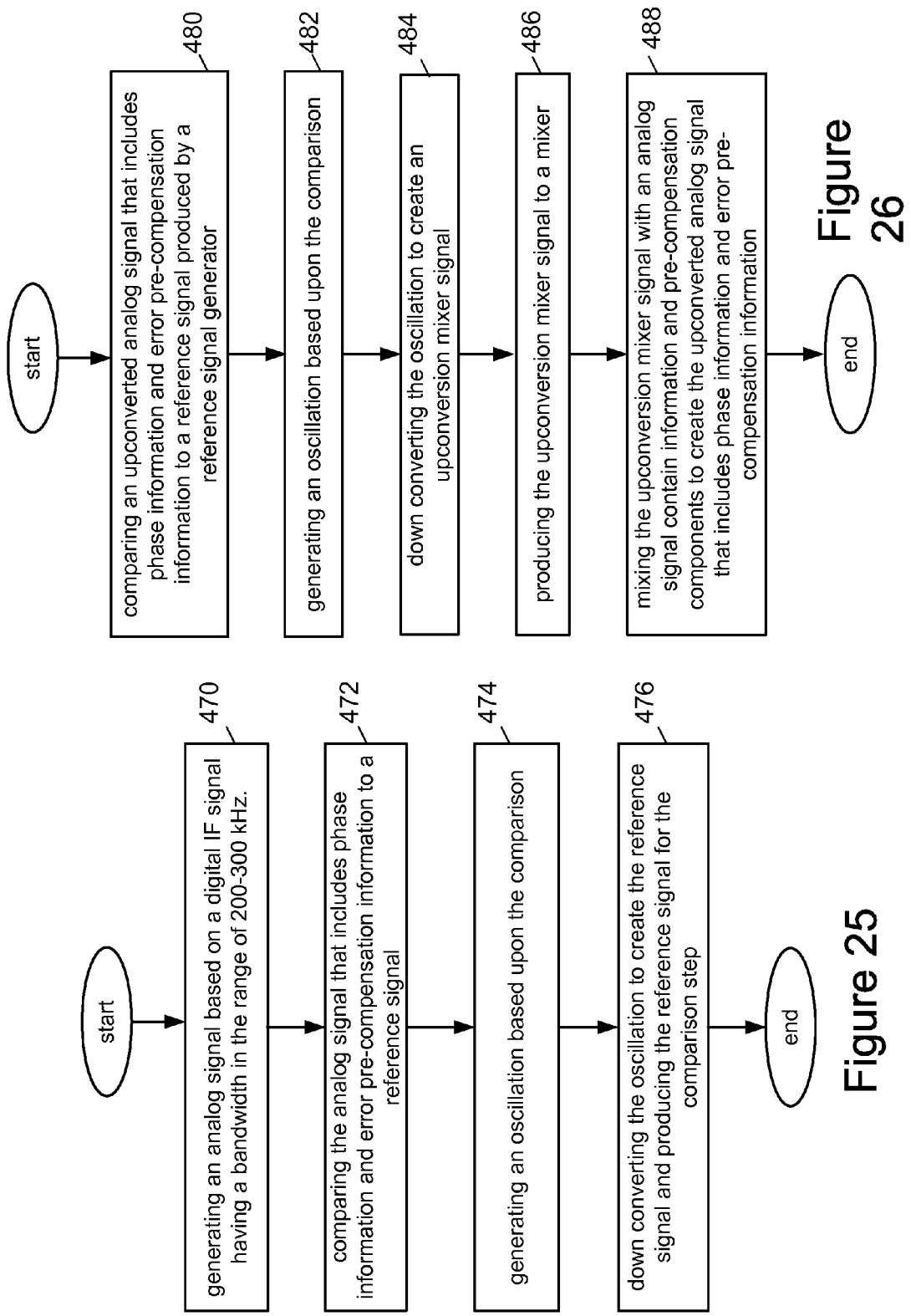

TECHNIQUE FOR IMPROVING MODULATION PERFORMANCE OF TRANSLATIONAL LOOP RF TRANSMITTERS

CROSS-REFERENCE TO RELATED APPLICATION

This application is a continuation of and claims priority to U.S. Utility application Ser. No. 10/676,221, filed Sep. 30, 2003 now U.S. Pat. No. 7,027,780, having a title of "A Technique for Improving Modulation Performance of Translational Loop RF Transmitters" which application is incorporated herein by reference in its entirety for all purposes.

BACKGROUND

1. Technical Field

The present invention relates to wireless communications and, more particularly, wideband wireless communication systems.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage (de-modulator). The low noise amplifier receives an inbound RF signal via the antenna and amplifies it. The one or more intermediate frequency stages mix the amplified RF signal with one or more local oscillations to convert the amplified RF signal into a baseband signal or an intermediate frequency (IF) signal. As used herein, the term "low IF" refers to both baseband and intermediate frequency signals. A filtering stage filters the low IF signals to attenuate unwanted out of band signals to produce a filtered signal. The data recovery stage recovers raw data from the filtered signal in accordance with the particular wireless communication standard. Alternate designs being pursued at this time further include direct conversion radios that produce a direct frequency conversion often in a plurality of mixing steps or stages.

Phase locked loops (PLLs) are becoming increasingly popular in integrated wireless transceivers as components for frequency generation and modulation. PLLs are typically used for one of a variety of functions, including frequency translation to up-convert a baseband (BB) signal to an intermediate frequency (IF) or to up-convert a baseband or IF signal to RF prior to amplification by a power amplifier and transmission (propagation). PLLs allow for a high degree of integration and, when implemented with the appropriate amount of programmability, can form a main building block for modulators that operate over a wide range of frequencies. Typically, a baseband processor produces a baseband digital signal that is converted to a continuous waveform signal by a digital-to-analog converter (DAC). The continuous waveform signal constitutes the analog baseband signal that requires up-converting to IF and then RF.

A class of PLL based transmitters, known as translational loops, have become particularly popular. Briefly, in a translational loop, the desired modulated spectrum is generated as some low IF or at DC and then is translated to the desired RF using a PLL. In applications with non-constant envelope modulation, a parallel path for amplitude variation modulates the output power amplifier to generate the desired amplitude variation. One problem with current translational loops, however, is that reference signals, and especially IF reference signals couple to an output VCO of the translational loops through undesired circuits paths. This phenomenon is referred to as "reference feed-through" or "IF feed-through" and is particularly prevalent in low voltage supply CMOS technologies optimized for digital processing. Many wireless communications standards, for example the GSM standard for cellular communications, impose strict limits on the spurious emissions of a given transmitter. Since reference feedthrough manifests itself as spurious emission in the RF output, many design efforts go into ensuring adequate attenuation of the reference feedthrough when designing a translational loop type transmitter for GSM. For example, when employing a 26 MHz reference signal, the GSM standard limits the reference feedthrough to −79 dBm (measured over a 100 kHz bandwidth). Normalized to a transmitter with an output power of +33dBm (a typical GSM specification), the limitation on the reference feedthrough is −112 decibels relative to the carrier (dBc).

The closed loop PLL signal filter of the translational loop can be used to attenuate the reference feedthrough since this is an input referred noise source. However, as it turns out, in CMOS technology the level of reference feedthrough is typically so significant that the closed loop PLL signal filter must be made very narrow, eg. a few hundred kilo-hertz (kHz), in order to attenuate the reference feedthrough to an acceptable level. This, however, in turn imposes a large distortion on the transmitted signal and causes the transmitter to fail the modulation accuracy requirements of GSM.

For example, FIG. 1 shows the RF output spectrum in decibels relative to the carrier (dBc) versus frequency offset from the carrier (in MHz) of the translational loop transmitter of a prior art transmitter The frequency range in FIG. 1 is 0-30 MHz relative to the RF carrier and demonstrates IF reference feed-through at a 26 MHz offset.

FIG. 2 shows the typical magnitude response of the closed loop PLL signal filter corresponding to the translational loop of FIG. 1. This closed loop response is as narrow as can be allowed for without imposing excessive distortion on the transmitted signal. FIG. 3 shows the attenuation of the PLL signal filter of the IF reference feed-through, i.e., corresponding to the region around 26 MHz offset.

For this example, the attenuation is approximately 52 dB, resulting in a reference feedthrough of −86 dBc. As an IF reference feed-through of −112 dBc or less is required to comply with GSM standards, it follows that this cannot be satisfied in the example of FIG. 1. Hence, a need exists for a modified translational loop RF transmitter that can meet such GSM standards.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 13 shows the "spurious emissions" requirements of the GSM standard as a function of frequency band;

FIGS. 25-27 are flowcharts illustrating various method steps according to various embodiments of the present invention.

DETAILED DESCRIPTION OF THE DRAWINGS

Figure 4:
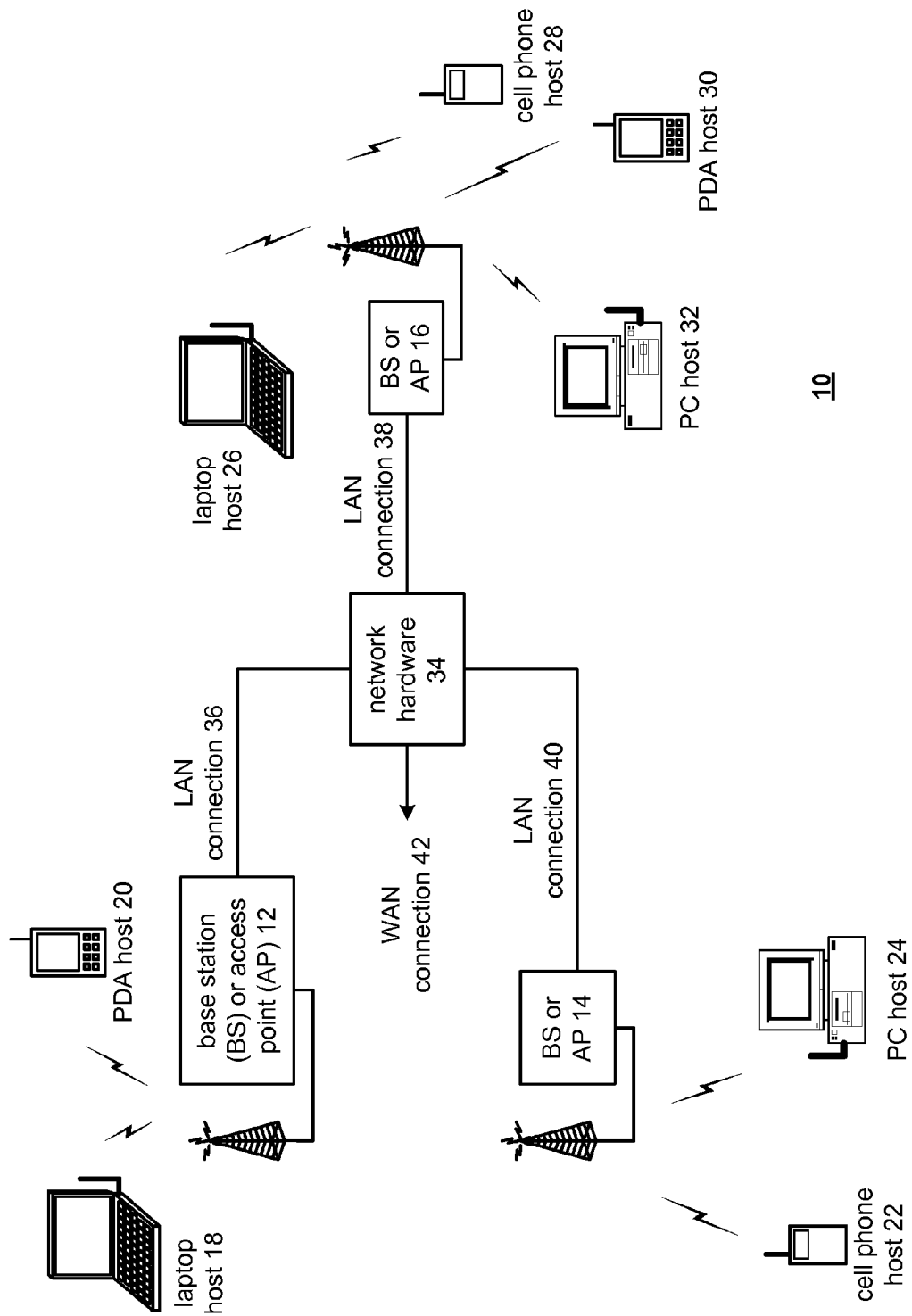
FIG. 4 is a functional block diagram illustrating a communication system that includes a plurality of base stations or access points (APs), a plurality of wireless communication devices and a network hardware component.

FIG. 4 is a functional block diagram illustrating a communication system 10 that includes a plurality of base stations or access points (APs) 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 5.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-topoint communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 5:
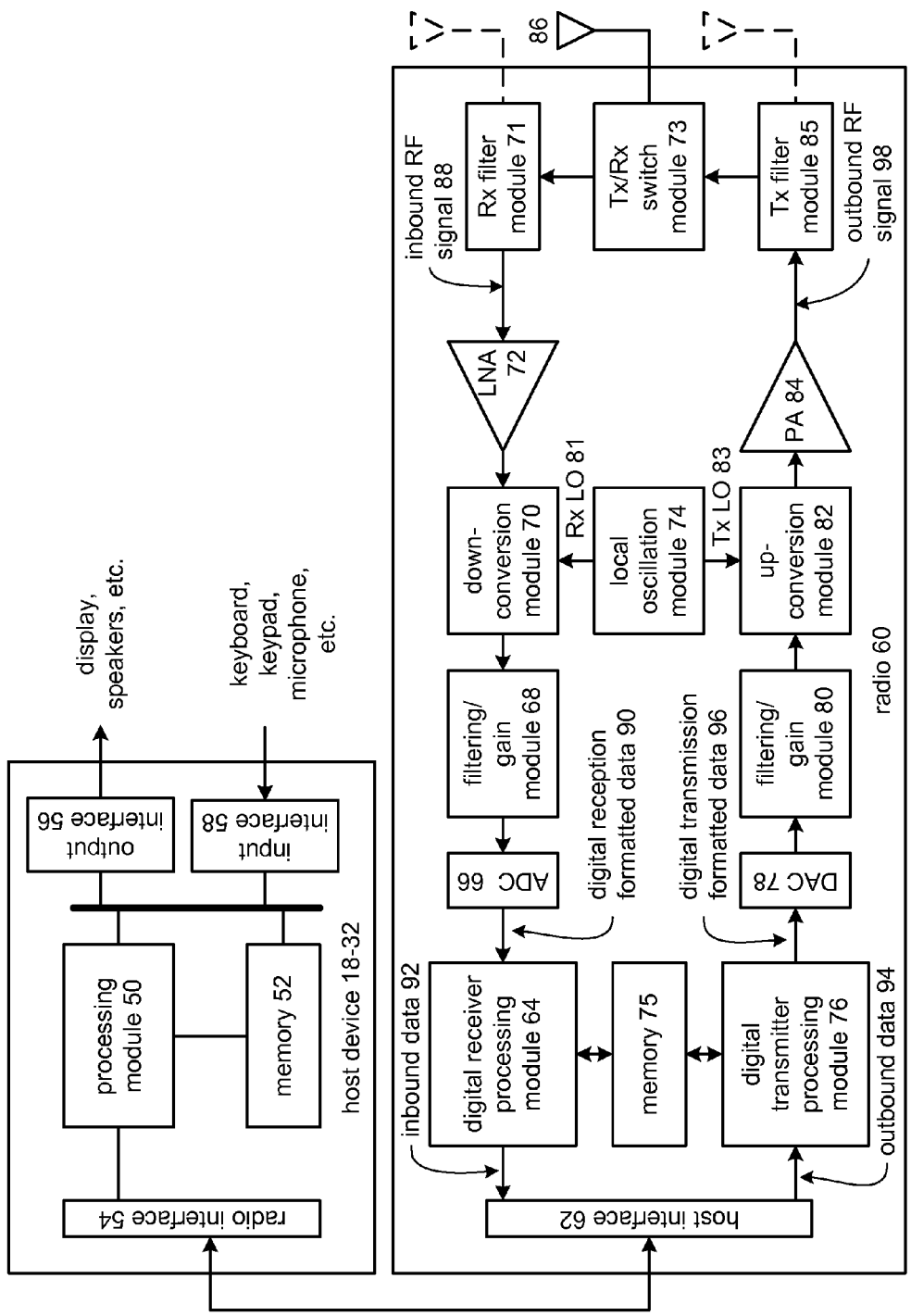
FIG. 5 is a schematic block diagram illustrating a wireless communication device as a host device and an associated radio.

FIG. 5 is a schematic block diagram illustrating a wireless communication device 18-32 as a host device and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/RX) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 is shared by the transmit and receive paths as regulated by the Tx/Rx switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the digital receiver processing module 64 and/or the digital transmitter processing module 76 executes, operational instructions corresponding to at least some of the functions illustrated herein.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of 100 KHz to a few Mega-Hertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. Local oscillation module 74 is, in one embodiment of the invention, a multi-stage mixer as described herein. The power amplifier 84 amplifies the RF signal to produce an outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 band pass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. Local oscillation module 74 is, in one embodiment of the invention, a multi-stage mixer as described herein. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

Figure 3:
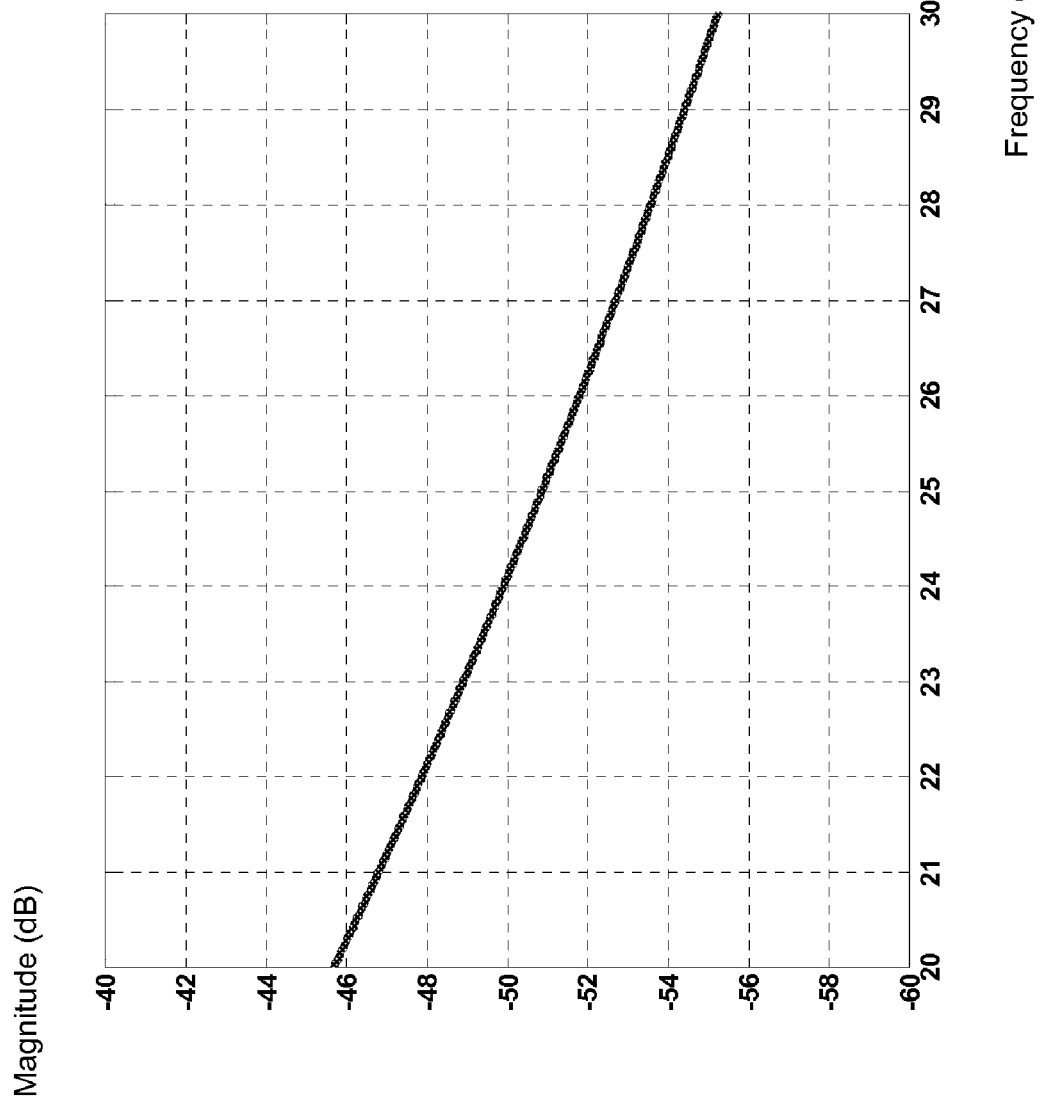
FIG. 3 shows the attenuation of the PLL signal filter of the IF reference feed-through at 26 MHz.

As one of average skill in the art will appreciate, the wireless communication device of FIG. 3 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of host device 18-32 and the digital receiver processing module 64 and the digital transmitter processing module 76 of radio 60 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76. FIG. 4 generally shows the elements of a radio transmitter. In accordance with the present invention, the circuitry shown may be structured as described in greater detail in FIG. 5.

Figure 6:
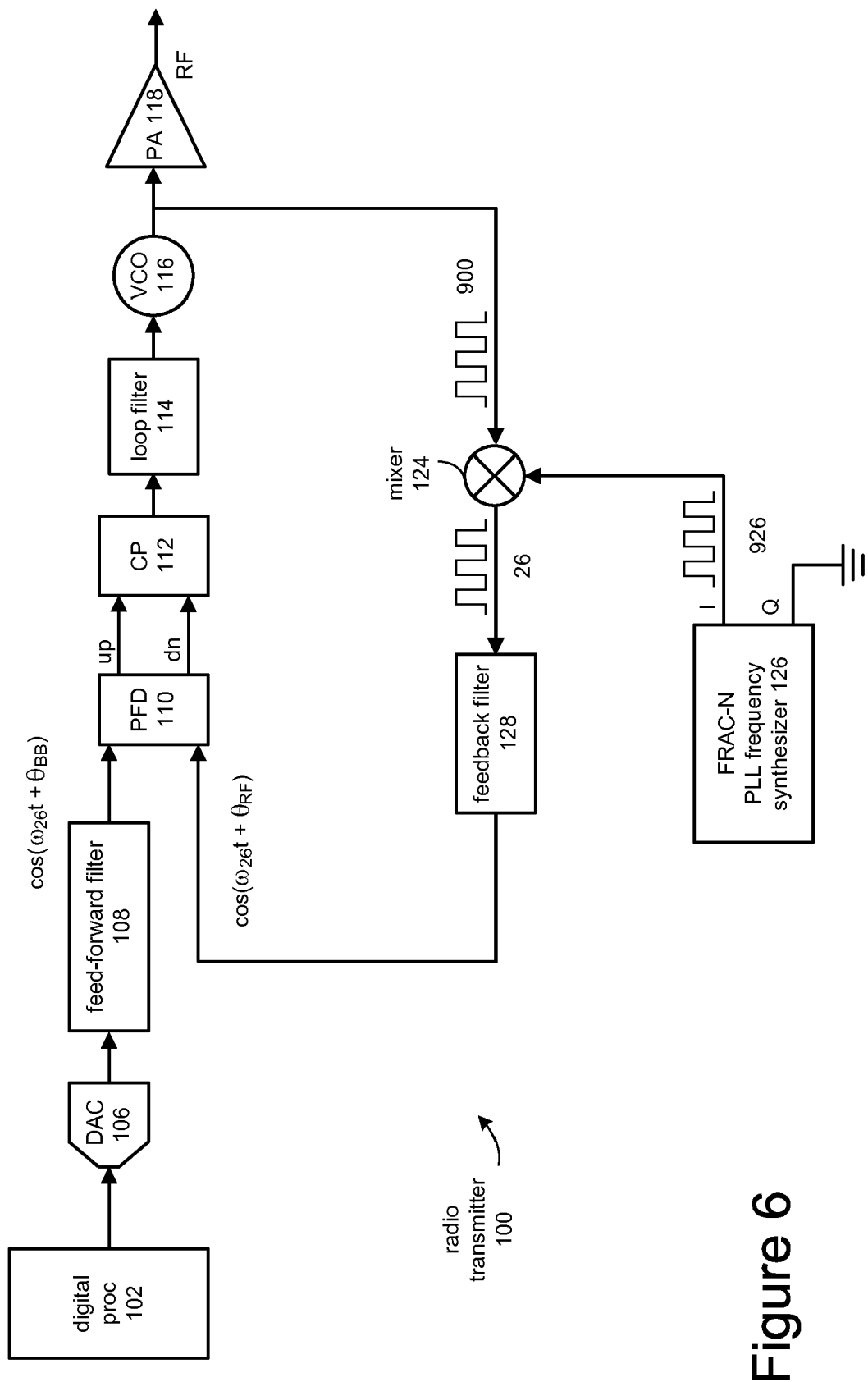
FIG. 6 is a functional block diagram of a radio transmitter formed according to one embodiment of the present invention.

FIG. 6 is a functional block diagram of a radio transmitter formed according to one embodiment of the present invention. A radio transmitter 100 includes a digital processor 102 that produces digitized intermediate frequency signals that define a phase and a frequency of a phase modulated signal. A digital-to-analog converter module 106 is coupled to receive the digitized IF signal and produces a continuous waveform IF signal to a filter 108. Filter 108 produces a filtered IF signal as a reference signal to a phase frequency detector (PFD) 110. The filtered IF signal, which may be represented as $\cos(\omega_{26}t+\theta_{BB})$, is a continuous waveform signal having a frequency of 26 MHz and a phase of $\theta_{BB}$. While the frequency of oscillation is 26 MHz in the described embodiment, the output frequency is a function of the digitized signal produced by digital processor 102. In this example, the digitized signal is an IF signal though the digitized signal may also be a low IF signal or a baseband frequency signal thereby resulting in a low IF or baseband frequency continuous waveform signal being produced from filter 108.

Not only is the frequency of the filtered IF signal produced by filter 108 determined by digital processor 102, but also the phase $\theta_{BB}$ as defined by in-phase and quadrature component values. Accordingly, when radio transmitter 100 is formed to operate as a GSM transmitter, digital processor 102 further defines a phase $\theta_{BB}$ of the filtered IF signal as a part of phase modulating the signal that is ultimately radiated as a radio frequency transmit signal.

The PFD 110 produces control signals to a charge pump (CP) 112 that, responsive to the control signals, produces a corresponding error current signal. More specifically, a magnitude of the error current signal is increased or decreased based upon the control signals. A loop filter 114 is coupled to receive the error current signal and to produce a corresponding error voltage signal to a voltage controlled oscillator (VCO) 116. An increase error current results in an increased error voltage signal produced by loop filter 114. VCO 116 produces an oscillation, which here also is the RF transmit signal. In the described embodiment, the RF transmit signal produced by VCO 116 is produced to a power amplifier 118 for amplification and radiation from an antenna as a constant envelope modulated signal. The phase of the oscillation, in a GSM network, defines the logic state of a particular data bit.

In the specific embodiment of FIG. 6, radio transmitter 100 is a GSM-based radio transmitter. Accordingly, the output oscillation or carrier frequency of the RF transmit signal produced by VCO 116 is equal to one of approximately 800, 900, 1800 or 1900 MHz, as defined by the GSM standard. As shown herein, the RF transmit signal that is produced by transmitter 100 has a 900 MHz frequency. Power amplifier 118 receives the 900 MHz GSM phase modulated signal for amplification.

For the purposes of the present example, VCO 116 produces an output frequency oscillation of 900 MHz as the RF transmit signal. The 900 MHz signal is further produced to a mixer 124 that is further coupled to receive a 926 MHz signal from a FRAC-N phase locked loop (PLL) frequency synthesizer 126. As is known by one of average skill in the art, mixer 124 multiplies or mixes the two input signals, here 900 MHz and 926 MHz, to produce a 26 MHz output signal as well as all odd order harmonics hereof. This feedback signal is produced to a feedback filter 128 that attenuates signals above 26 MHz signal to produce a 26 MHz feedback signal that may be represented as $\cos(\omega_{26}t+\theta_{RF})$. The feedback signal is produced to PFD 110 that compares the phase of the feedback signal to the filtered IF signal (the reference signal) to cause the output phase of the RF transmit signal produced by VCO 116 to track the phase of the filtered IF signal that was produced from the digitized IF signal generated by digital processor 102.

In analyzing the feedback signal produced by feedback filter 128, one may note that the frequency is 26 MHz. Above it was mentioned that FRAC-N PLL frequency synthesizer 126 produces a 926 MHz signal to mixer 124. The output of mixer 124, therefore, is a 26 MHz signal. As is known by one of average skill in the art, a mixer, such as mixer 124, will output a frequency reflecting a difference of the two input frequencies. Accordingly, the frequency of FRAC-N PLL frequency synthesizer 126 is selected so that, when mixed 900 MHz signal, a desired frequency feedback signal (here, 26 MHz) is produced to feedback filter 128.

The loop filter 114 in the described embodiment of the invention of FIG. 6 is a narrow bandwidth filter that provides improved filtering of spurious tones generated reference sources, among other sources, and particularly IF reference sources. Thus, while loop filter 114 provides improved filtering for a frequency band of interest in contrast to filters having larger bandwidth, loop filter adds distortion to the signals. More specifically, loop filter 114 introduces some magnitude distortion and some group delay variation for the various frequency components of a signal being filtered within the loop filter 114. Accordingly, as will be explained in greater detail below, digital processor 102 compensates for the magnitude distortion and group delay variation introduced by the corresponding PLL closed loop filter by "pre-distoring" the digital data produced to DAC 106. More specifically, processor 102 inverts the magnitude distortion and delays faster frequency components to reduce the overall magnitude distortion and group delay variation.

Figure 7:
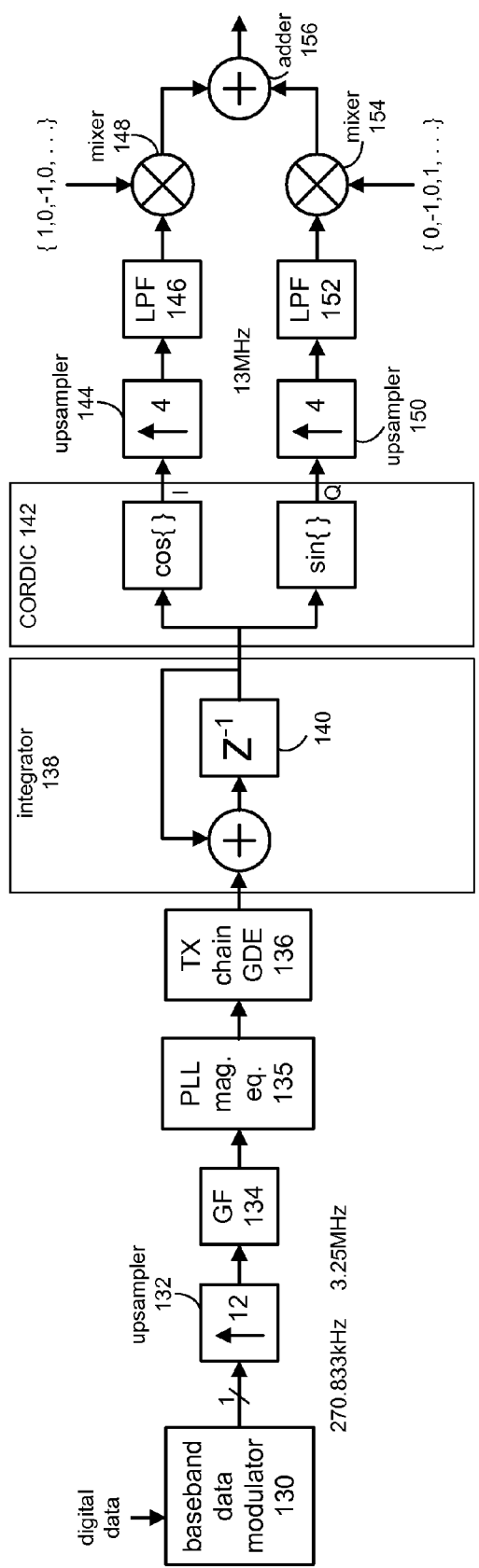
FIG. 7 is a digital processor of a radio transmitter that receives digital data, modulates the digital data and produces a digitized IF signal according to one embodiment of the present invention.

FIG. 7 is a digital processor of a radio transmitter that receives digital data, modulates the digital data and produces a digitized IF signal according to one embodiment of the present invention. A baseband data modulator 130 is coupled to receive digital data to modulate the digital data and to produce a digitized baseband signal. An upsampler (interpolator) 132 is coupled to receive the digitized baseband signal. Upsampler 132 produces an upsampled baseband signal based on the digitized baseband signal. In the described embodiment of the invention, upsampler 132 increases the sample rate of the digitized baseband signal by a factor of 12. In the described embodiment of the invention, a sample rate of the digitized baseband signal is approximately equal to 270.833 kHz.

A Gaussian filter 134 is coupled to receive the upsampled baseband signal and to produce a Gaussian filtered baseband signal. A PLL magnitude equalization block 135 is coupled to receive the Gaussian filtered baseband signal and to compensate for magnitude response characteristics of at least one downstream filter. Generally, because a loop filter utilized in the present invention has a relatively small bandwidth, it introduces distortion to the signal due to its sharp corner and filtering. Accordingly, the PLL magnitude equalization block 135 provides an inverse PLL magnitude distortion so that, when the signals are propagated through the transmit path circuit elements, downstream distortion is minimized or eliminated. Stated differently, PLL magnitude equalization block 135 pre-distorts the transmit signal such that the transmit signal effectively is filtered by a filter with much wider bandwidth than that of the narrow bandwidth analog PLL signal loop filter of the translational loop of FIGS. 6 and 8 (below).

A PLL magnitude equalization block 135 output is then produced to a TX chain group delay equalizer (TX chain GDE) 136 that compensates for transmitter chain group delay variations. More specifically, TX chain GDE 136 adds delay to frequency components that propagate faster than other frequency components to reduce the overall variation in group delay for the transmit chain. Thus, TX chain GDE 136 pre-distorts the transmit signal processing path such that the transmit signal effectively is filtered by a linear phase filter.

In the described embodiment of the invention, both magnitude equalization block 135 and TX chain GDE 136 are fourth order IIR filters. The derivation of the coefficients for a fourth order IIR filter depend in part upon the frequency band of operation and the bandwidth of the frequency band. Generally, though, the transfer function for the downstream loop filter is evaluated and coefficients are derived to pre-compensate for magnitude distortion and group delay variation that is introduced in the signal path. One of average skill in the art of digital filter design may readily determine such coefficients according to specific design requirements and constraints. TX chain GDE 136 produces a partially delayed output to an integrator 138 which comprises a delay element 140 whose output is produced to a feedback loop to integrate the output of the phase modulation index adjust block 136. An integrated baseband signal produced by integrator 138 is then produced to a coordinate rotation digital computer (CORDIC) 142. CORDIC 142 modulates the data and produces corresponding I & Q vector digital data. The I vector digital data is produced to an upsampler 144 that upsamples the I vector digital data. In the described embodiment of the invention, the I vector digital data is upsampled 4 times in one embodiment of the invention (to produce low IF digital data having a sample frequency of 13 MHz). In an alternate embodiment, the I vector digital data is upsampled 32 times to produce an IF signal (104 MHz). Upsampler 144 produces upsampled I vector (in-phase) data to a low-pass filter 146 that produces filtered I vector data. The filtered I vector data is produced to a mixer 148 that is further coupled to receive modulation data (a repeating sequence of 1, 0, −1, 0) for multiplying with successive bits of the filtered I vector (in-phase) data.

Similarly, CORDIC 142 produces Q vector (quadrature phase) digital data to an upsampler 150. Upsampler 150 upsamples the Q vector digital data by the same amount as upsampler 144. In the described embodiment, the data is upsampled by a factor of 4. Alternatively, the data is upsample 32 times. Generally, the I and Q branches are upsampled by an equivalent amount. Upsampler 150 produces upsampled Q vector data to a low-pass filter 152 that, in turn, produces filtered Q vector data to a mixer 154. Mixer 154 also is coupled to receive modulation data, namely (a repeating sequence of 0, −1, 0, 1) which it multiplies with successive bits of the filtered Q vector (quadrature) data. The outputs of mixers 148 and 154 are then produced to a summing block (adder) 156 that produces the digitized IF signal.

It should be noted that the digitized IF signal has been upsampled, in the described embodiment, 12 times and then one of 4 or 32 times. Because the baseband data modulator produces data having a sample rate of 270.833 KHz, the digitized IF signal has a corresponding sample rate of one of 13 or 104 MHz. In one embodiment of the present invention, upsamplers 132, 144 and 150 upsample at higher rates to produce a digitized IF signal sampled at 338 MHz. Different upsampling amounts may be used according to design requirements including tolerable frequency bands for harmonics as is known by one of average skill in the art.

Figure 8:
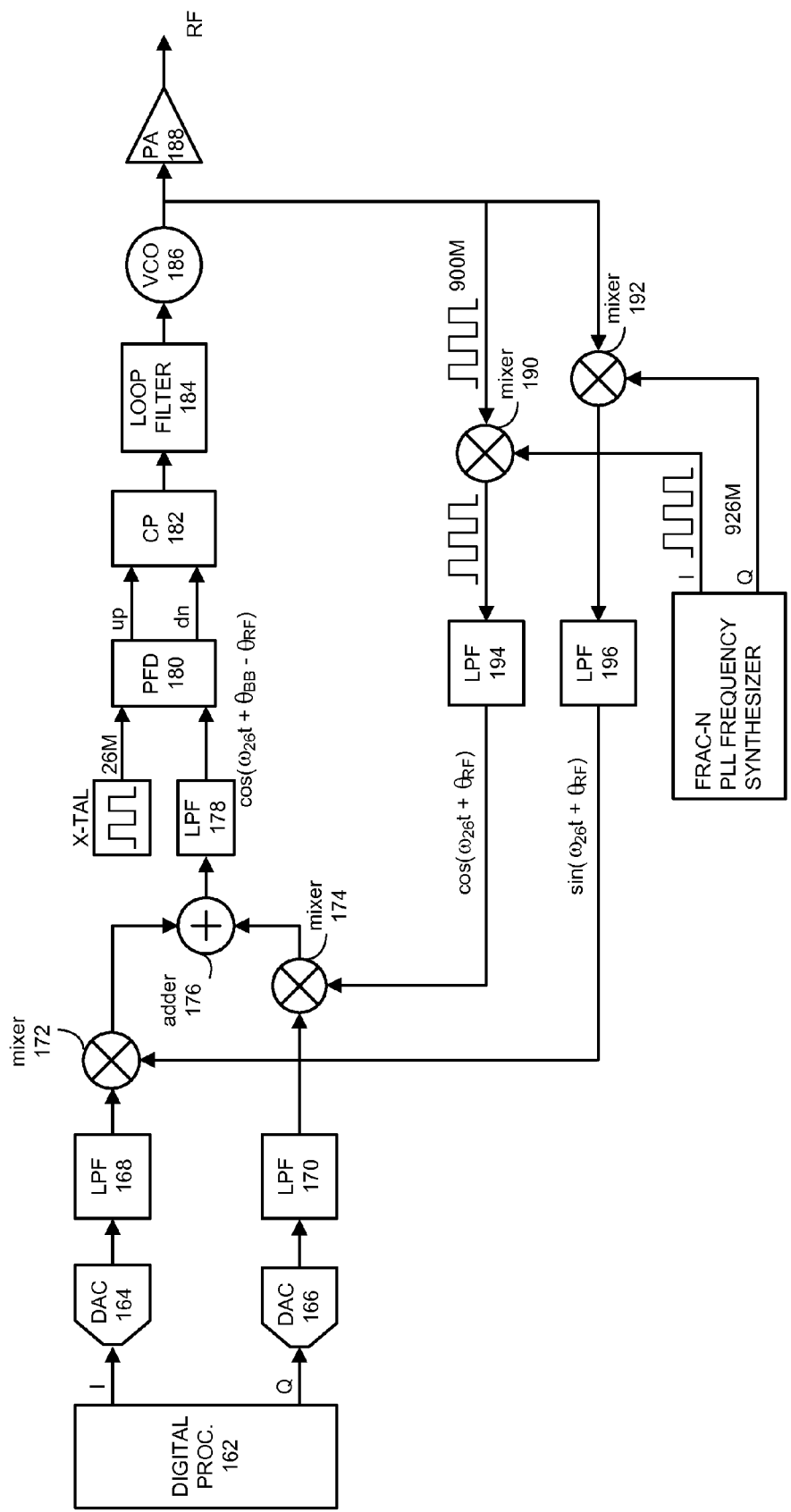
FIG. 8 illustrates a translational loop transmitter in accordance with some current designs for use in a global system for mobile communications (GSM) network.

FIG. 8 illustrates a translational loop transmitter in accordance with some current designs for use in a global system for mobile communications (GSM) network. The transmitter 160 of FIG. 6 may, for example, be used as a so-called "quad" band transmitter, where four transmission bands are supported for GSM. Specifically, these bands are located in the 1900 MHz, 1800 MHz, 900 Mhz, and 800 MHz range. The transmitter of FIG. 6 may readily be constructed to produce radio frequency transmissions at any one of these four bands. For simplicity, only one power amp is shown. In one embodiment, however, a divide-by-two module and an additional power amplifier are coupled to receive the oscillation from VCO 186. Accordingly, by selecting between an 1800 and 1900 MHz output frequency from VCO 186 and by selecting between PA 188 or a PA coupled by way of the divide-by-two module (both not shown), a corresponding output frequency of 850 MHz, 900 MHz, 1800 MHz or 1900 MHz may be selected.

Generally, the transmitter of FIG. 6 includes a baseband processor 162 that produces a low frequency digital signal (over I and Q signal paths) that is converted by a pair of DACs 164 and 166 and is low-pass filtered by LPFs 168 and 170 to create a low frequency continuous waveform signal. A translational loop is then used to up-convert the low frequency continuous waveform signal to the desired transmission frequency for transmission from a power amplifier. Because this transmitter is utilized in a GSM network in which the information is conveyed in a phase-modulated carrier, the digital processor of the transmitter of FIG. 1 phase modulates the digital data.

A pair of mixers 172 and 174 mix the signals from I and Q feedback paths with the I and Q signals produced by digital processor 162 and produce mixed I and Q branch signals to an adder 176. Adder 176 sums the mixed I and Q branch signals and produces a continuous waveform signal to LPF 178. LPF 178 then produces a filtered analog signal to phase and frequency detector (PFD) 180. PFD 180 further receives a 26 MHz crystal reference and produces an error control signal to a charge pump 182. This approach is in contrast to the approach of FIG. 6 in which the signals produced by the digital processor are produced to the PFD as a reference signal for comparison to the feedback signal. Moreover, while the approach of FIG. 6 is for a radio transmitter in which the digital processor produced IF digital data, it is understood that the configuration of I and Q branches and mixers as shown here in FIG. 8 may be used to produce mixed I and Q branch signals as reference signals to PFD 180 instead of the crystal based reference for comparison with a combined feedback signal.

Charge pump 182 produces an error current to a loop low-pass filter (Loop Filter) 184 based upon the error control signal produced by PFD 180. Loop filter 184 produces a corresponding error voltage to a voltage controlled oscillator (VCO) 186 that, in turn, produces a corresponding oscillation that is received and amplified by a power amplifier 188 for transmission from an antenna. A pair of offset mixers 190 and 192 are coupled to receive the oscillation produced by VCO 186 to create I and Q branch feedback signals that are produced to mixers 172 and 174 as described above. More specifically, offset mixers 190 and 192 further are coupled to receive a 926 MHz signal for mixing with the 900 MHz output produced by VCO 186. The output of mixers 190 and 192 are I and Q branch signals having a 26 MHz frequency. The outputs of mixers 190 and 192 are produced to LPFs 194 and 196 to filter and create the actual feedback signals that are produced to mixers 172 and 174. Generally, radio frequency channel selection is achieved by employing a fractional-n (FRAC-N) frequency synthesizer that defines a frequency that is to be mixed with the output of VCO 186 to create a feedback signal with a specified frequency as is known by one of average skill in the art.

A qualitative description of the operation of the translational loop is as follows. The sum of the mixing products of the baseband I & Q components with down-converted RF output I & Q components are low-pass filtered to generate a 26 MHz sinusoid whose excess phase component equals the difference between the desired baseband phase signal and the RF output phase signal. The 26 MHz IF is extracted by the PFD whose output is the phase error signal. As in any other properly designed PLL, the closed loop action of the loop causes the error signal to approach zero; hence, the phase of the RF output tracks the phase of the baseband signal, as desired.

The translational loop transmitter of FIG. 8 includes a digital processor 162 that pre-distorts the digital data as described herein. As may be seen from the examples of FIGS. 4 and 6, the present invention may be used in a variety of translational loop configurations that produce a variety of output frequency signals. This particular transmitter is intended for application in GSM cellular telephony.

Figure 9B:
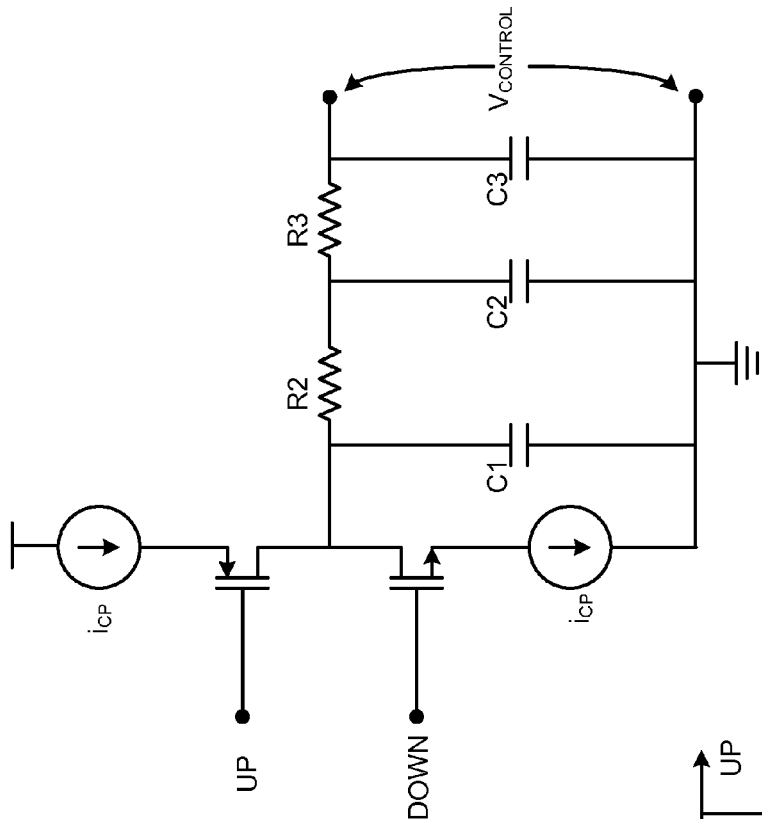
FIGS. 9A and 9B show details of a typical charge pump and loop filter configuration formed according to one embodiment of the present invention.
Figure 9A:
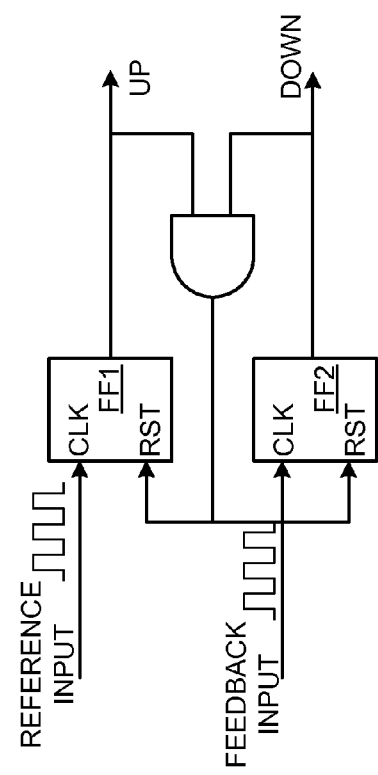

FIGS. 9A and 9B show details of a typical charge pump and loop filter configuration formed according to one embodiment of the present invention. As may be seen, first and second flip flops FF1 and FF2 received a reference input and a feedback input. The output of the flip flops FF1 and FF2 are reset only when both FF1 and FF2 produce a logic 1 based on having a logic 1 input from the reference and feedback signals. Accordingly, a difference in phase or frequency results in a corresponding logic 1 being produced either from FF1 or FF2 depending upon whether the feedback signal lags or leads the reference signal. The charge pump of FIG. 7B then generates a corresponding control voltage that is produced to the VCO of the translational loop. The operation of the PFD and CP of FIGS. 7A and 7B are known and readily appreciated by one of average skill in the art.

Figure 10:
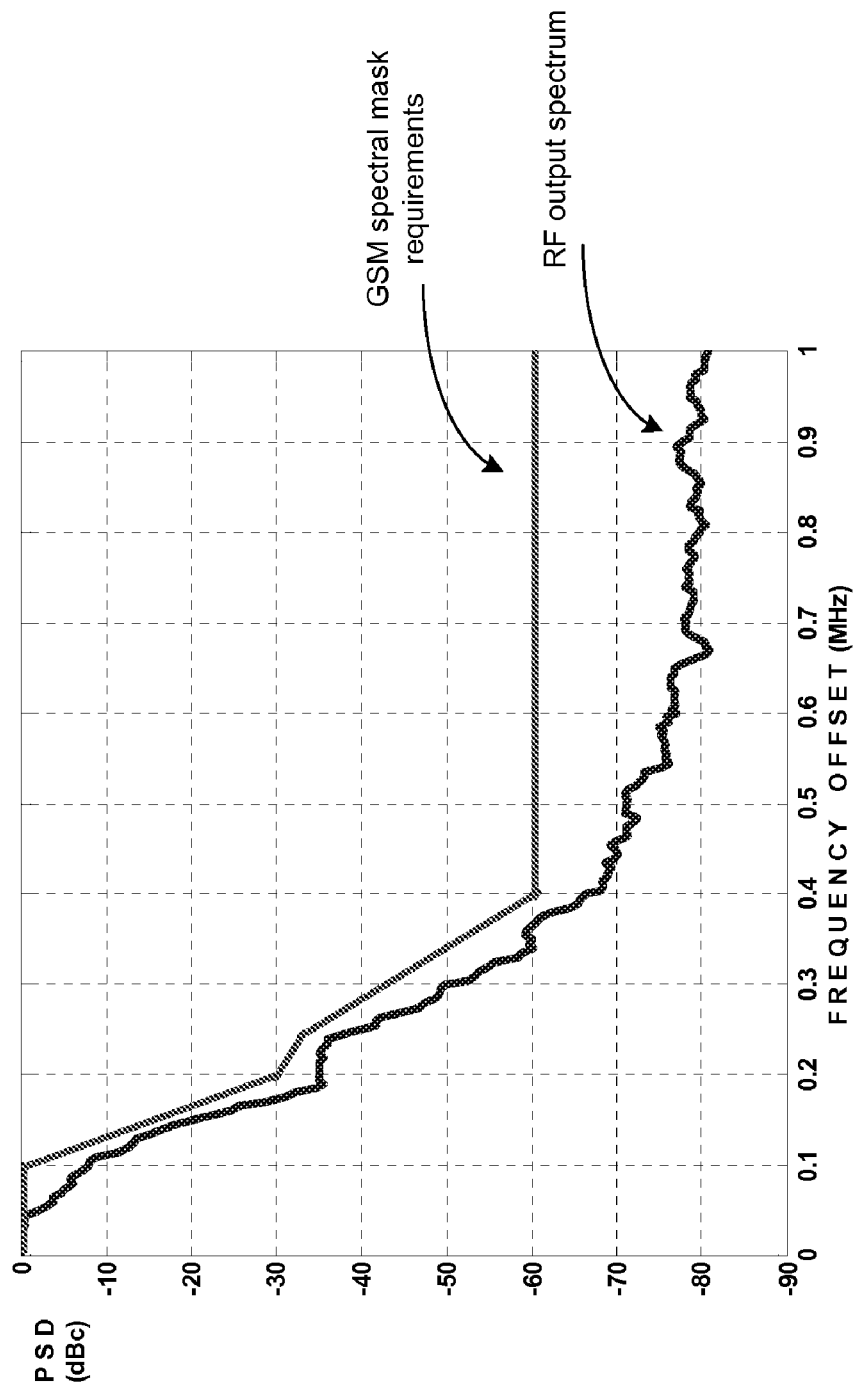
FIG. 10 is a plot of the typical RF output spectrum when measured with a measurement filter of 30 kHz bandwidth, as prescribed by the GSM standard as well as the required spectral mask.
Figures 11, 12:
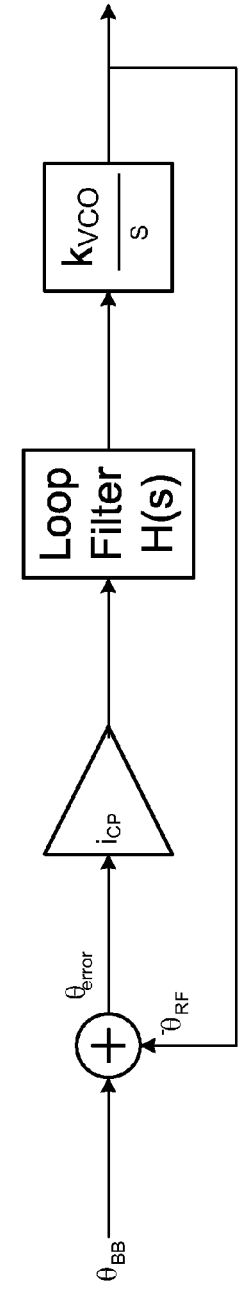
FIG. 11 gives the details of the spectral mask requirements.
FIG. 12 shows a linearized model of the translational loop RF transmitter.

FIG. 10 is a plot of the RF output spectrum when measured with a measurement filter of 30 kHz bandwidth, as prescribed by the GSM standard. Also shown are the spectral mask requirements of the GSM standard. FIG. 11 gives the details of the spectral mask requirements. The combination of the using a loop filter with a narrow bandwidth in the order of 200-300 kHz with the digital processor that pre-distorts digital signals to compensate for downstream distortion allows the radio transmitter of FIGS. 6 and 8 to satisfy the spectral mask requirements of FIGS. 10 and 11.

FIG. 12 shows a linearized model of the translational loop RF transmitter. This model represents the effective signal processing performed by the phase locked loop on the baseband signal as it is translated to the RF. In the figure, $\Theta_{BB}$ denotes the phase modulation generated by the digital baseband processor, and $\Theta_{RF}$ denotes the phase modulation of the RF output signal. Applying standard linear system analysis, the transfer function between RF output and baseband processor output can be expressed in terms of charge pump current, $i_{CP}$, loop components, and VCO sensitivity, $k_{VCO}$:

$$H(s) \equiv \frac{\Theta_{RF}}{\Theta_{BB}} =$$

$$\frac{i_{CP}k_{VCC}(C_2R_2s+1)}{C_1C_2C_3R_2R_3s^4 + (C_1C_3R_3 + C_1C_2R_2 + C_2C_3R_2 + C_2C_3R_3)s^3 + (C_1+C_2+C_3)s^3 + i_{CP}k_{VCO}(C_2R_2s+1)}$$

Subsequently, the transfer function H(s) will be referred to as the PLL signal filter. Ideally, it is desirable that H(s)=1 such that $\Theta_{RF}=\Theta_{BB}$ for all frequencies. In this case, the PLL signal filter imposes no distortion on the signal and therefore does not introduce modulation error. However, in practice, designing the PLL such that H(s)=1, i.e., has infinite bandwidth, is impossible. First, loop stability considerations dictate that the bandwidth of the PLL signal filter be less than about 1/10 of the IF frequency, i.e., for the example PLL, H(s) must thus have bandwidth less than 2.6 MHz. Second, narrowing the PLL signal filter bandwidth reduces the amount of "feed-through" of the IF reference signal to the RF output signal. IF reference feed-through is the result of non-zero reset delay of the PFD as well as mismatches between the "up" and "down" current sources of the charge pump. These non-ideal effects create a periodic signal on the VCO control voltage corresponding to the IF frequency. Typically, in a high-speed digital CMOS process, the reset delay of the PFD is a few nano-seconds and the mismatch of the charge pump current sources 5-10%.

Applications such as GSM have strict limitations on the amount tolerable IF reference feed-through. FIG. 13 shows the "spurious emissions" requirements of the GSM standard as a function of frequency band. For example, when the transmitter is operating in the GSM900 band, the IF reference feed-through, which occurs at 26 MHz offset from the TX frequency, must be limited to −79 dBm, or −112 dBc when normalizing to a transmit power of +33 dBm. Designing a PLL signal filter that provides strong attenuation of the reference feed-through significantly simplifies the design of the PFD and charge pump to meet this stringent spurious emissions requirement.

In the prior art, the maximum narrowness of H(s) is mainly dictated by the bandwidth of the signal and the permissible modulation error. For example, in GSM, where the channel spacing is 200 kHz and the root-mean-square (RMS) transmitter modulation error performance must be better than 5° and the peak modulation error must be better than 20°, designing the PLL filter narrower than 1 MHz leads to prohibitively large modulation errors. In this case, the attenuation of reference feed-through by the PLL filter is limited and—for practical PFD reset delays and CP current source mismatches in a CMOS process—may not suffice to meet the spurious emissions requirements of the GSM standard as stated in the example.

Figure 2:
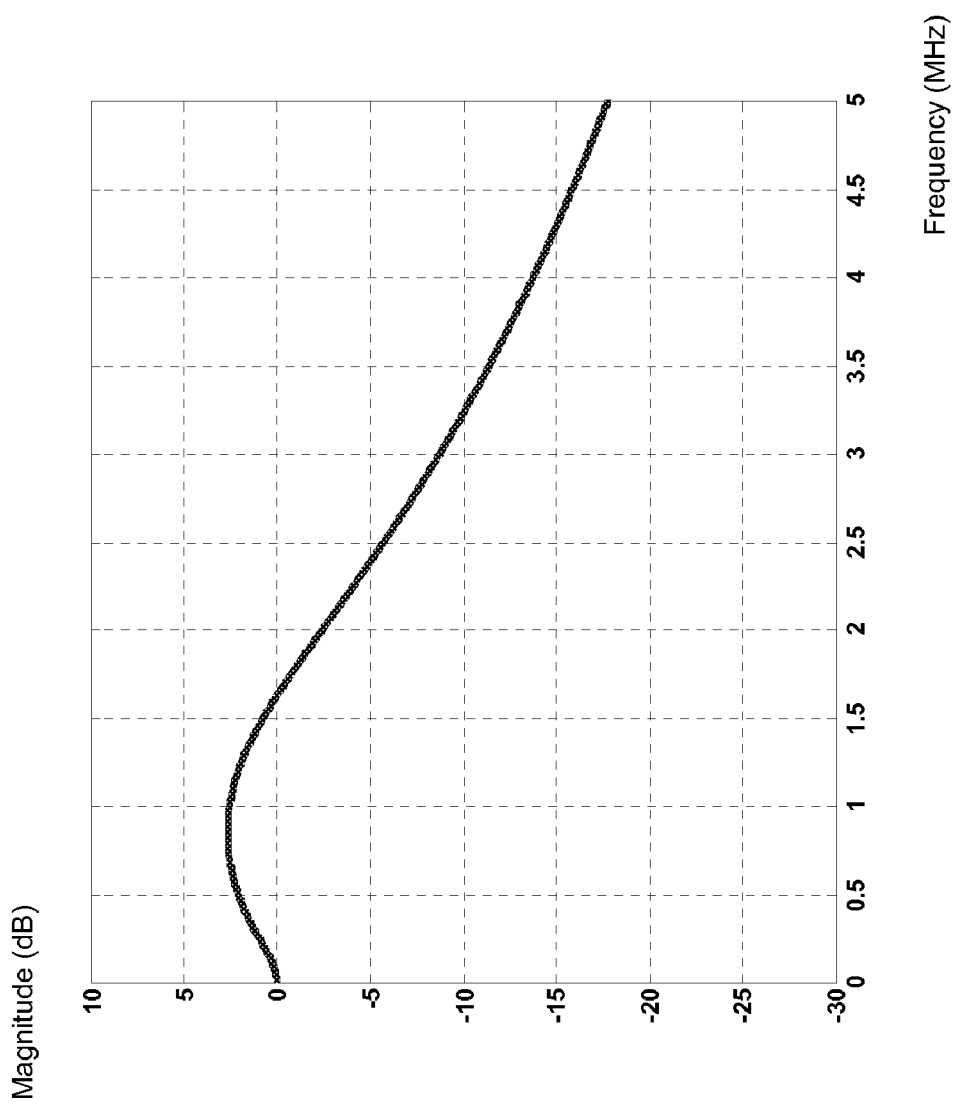
FIG. 2 shows the magnitude response of a typical PLL signal loop filter of the translational loop of FIG. 1.

Modulation error as a result of a narrow PLL signal filter is due to both amplitude distortion as well a group delay variation—or, equivalently, non-linear phase response—over the signal band of interest. Stated in popular terms, group delay variation causes different frequency components of the transmit signal to travel through the transmit chain at different speeds, thereby causing inter-symbol interference. As an example, for the translational loop of prior art considered in the above, the modulation error resulting from the PLL signal filter shown in FIGS. 2 and 3 is (RMS, Peak)=(0.53°, 1.84°). While this amount of modulation error is less than the GSM standard permits, it is typically the maximum that can be allowed in the absence of other non-ideal effects such as analog circuit noise and non-linearities, component variations due to process variations, and component performance fluctuations due to temperature variations. All these effects add up to form the total modulation error.

Figure 14:
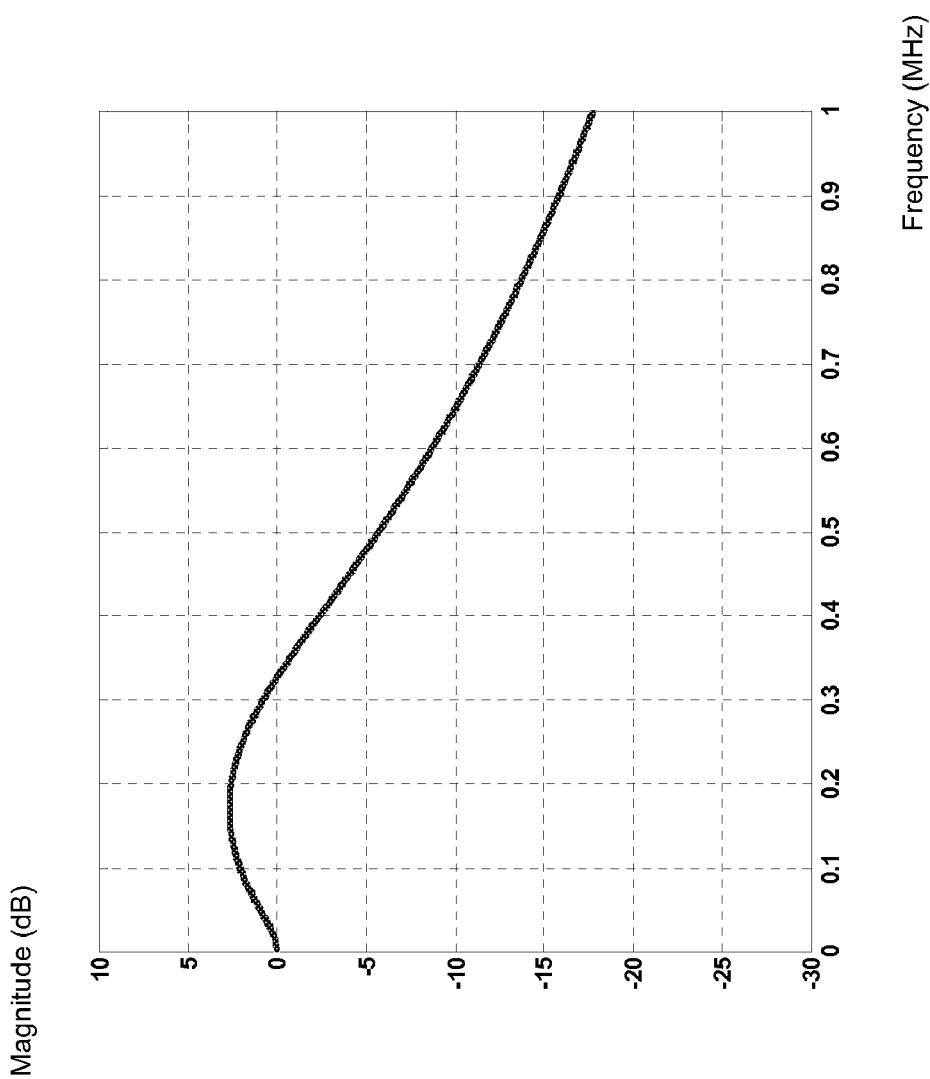
FIG. 14 shows the magnitude response of the PLL signal filter of the translational loop RF transmitter designed in accordance with the present invention.

FIG. 14 shows the magnitude response of the PLL signal filter of the translational loop RF transmitter designed in accordance with the present invention. Notice that the 3 dB bandwidth of the PLL signal filter is about 400 kHz, which is considerably smaller than permissible in prior art. The component values of the loop filter according to the present invention are $i_{CP}$=40 uA, $C_1$=24.4 pF, $C_2$=252 pF, $C_3$=8.13 pF, $R_2$=8.75 kΩ, $R_3$=9.65 kΩ, and $k_{VCO}$=10 MHz/V.

Figure 15:
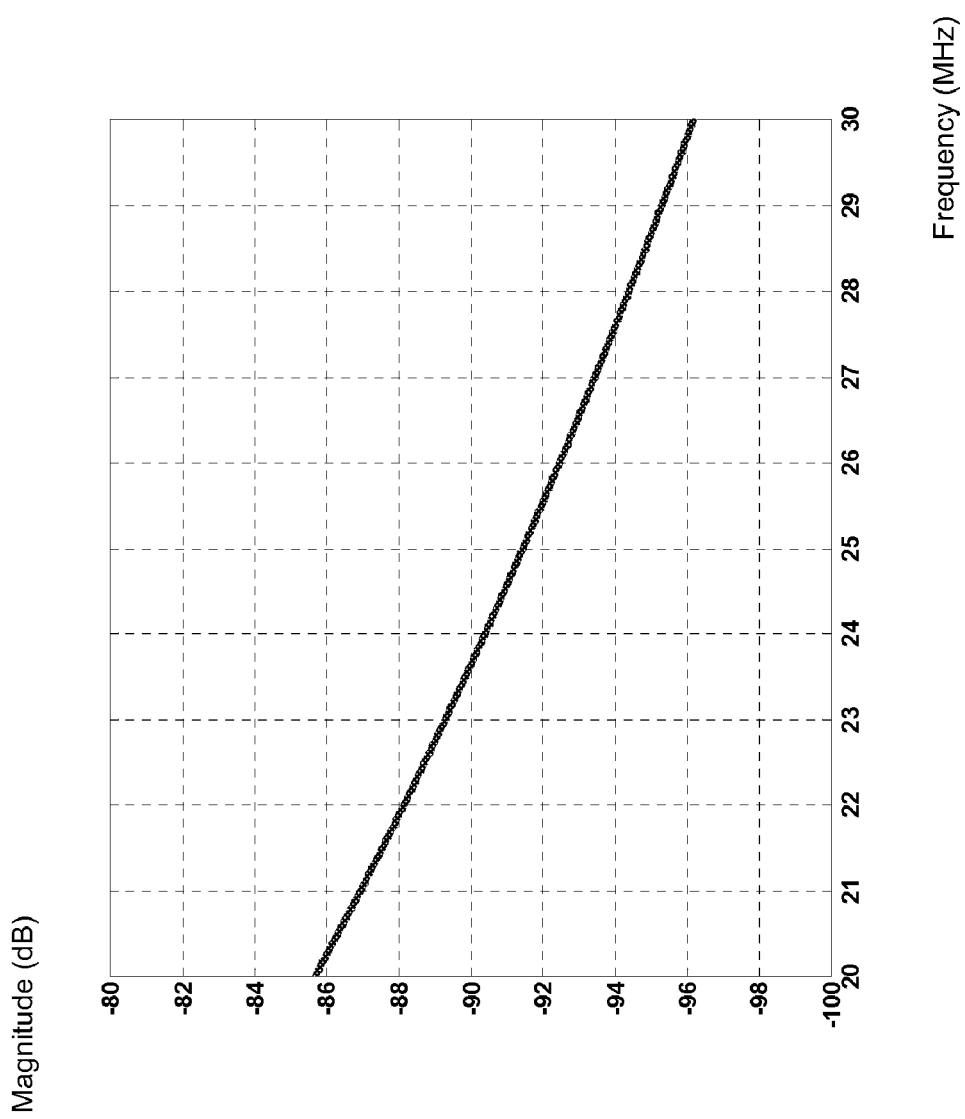
FIG. 15 shows the attenuation of the PLL signal filter of the IF reference feed-through at 26 MHz.

FIG. 15 shows the attenuation of the PLL signal filter of the IF reference feed-through, i.e., corresponding to the region around 26 MHz offset. For this example, the attenuation is approximately 92 dB, or about 40 dB more than in prior art.

Figure 1:
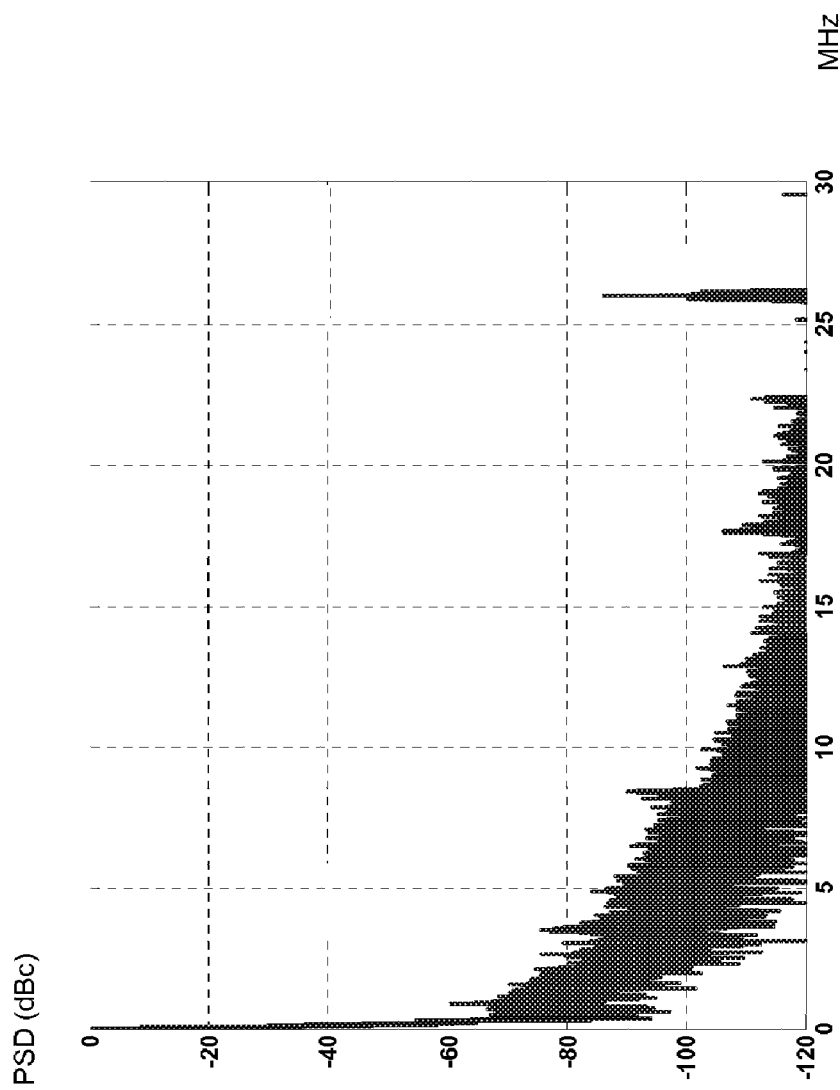
FIG. 1 shows the RF output spectrum in decibels relative to the carrier (dBc) of the translational loop transmitter of a prior art transmitter with a prior art translational loop versus frequency offset from the carrier (in MHz)
Figure 16:
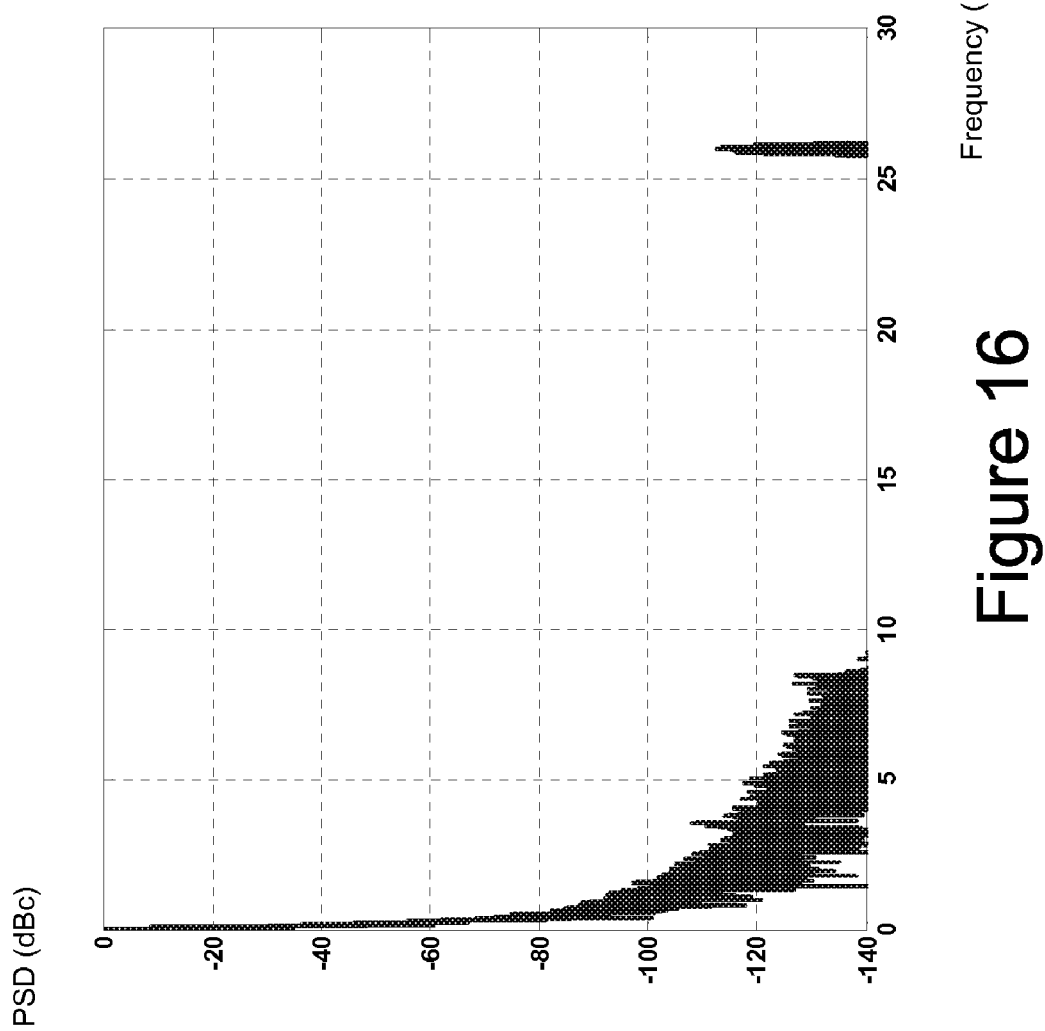
FIG. 16 shows the RF output spectrum of the translational loop transmitter of FIG. 1 in accordance with the present invention, also showing reference feed-through at 26 MHz carrier offset.

FIG. 16 shows the RF output spectrum of the translational loop transmitter of FIG. 1 in accordance with the present invention when employing the loop filter of FIGS. 14 and 15 and the same PFD reset delay and mismatches in the charge pump current sources as used for FIG. 12. The frequency range in FIG. 14 is 0-30 MHz relative to the RF carrier and demonstrates IF reference feed-through at 26 MHz offset. The GSM IF reference feed-through requirement of −112 dBc is now satisfied with comfortable margin. In addition, the modulation error resulting from this narrow PLL signal filter is merely (RMS, Peak)=(0.14°, 0.40°).

Figure 17:
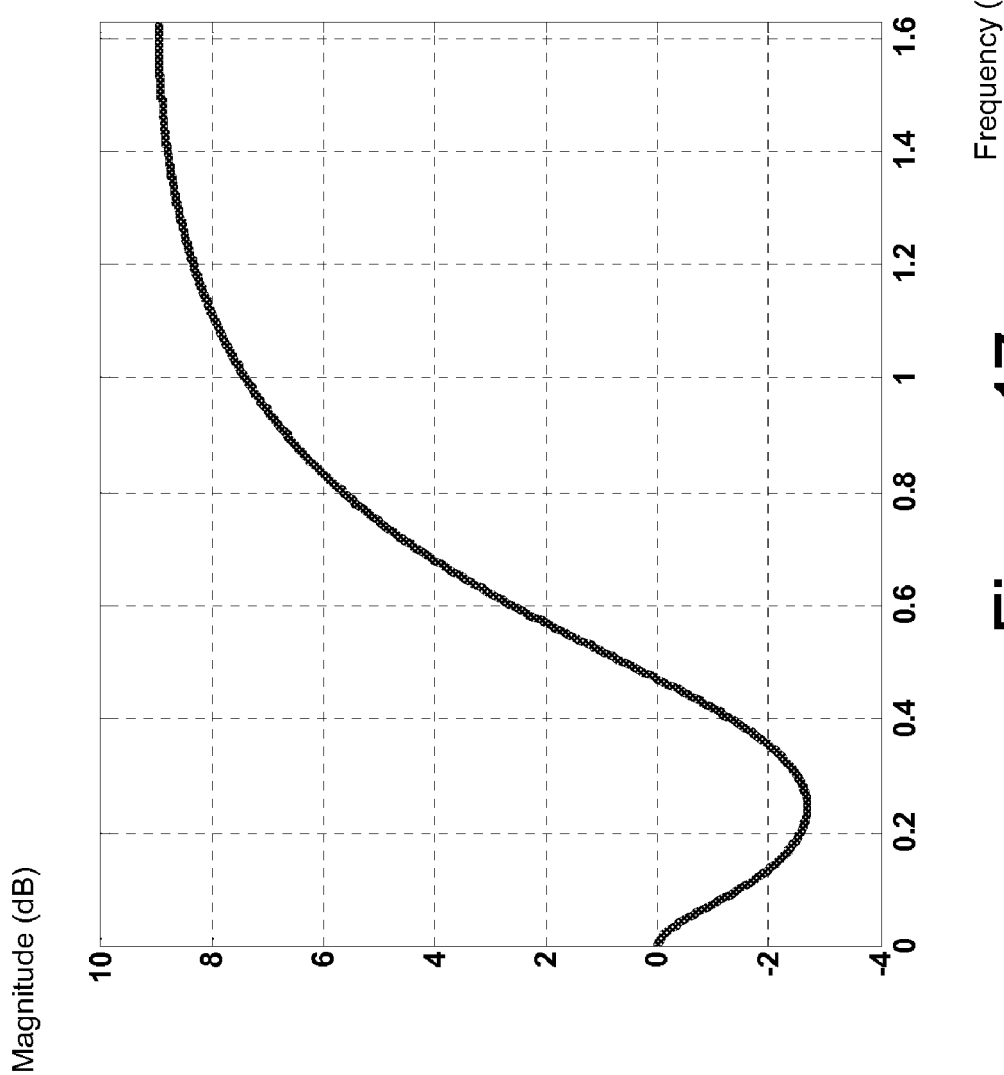
FIG. 17 shows the magnitude response of the magnitude equalizer of the baseband processor of FIG. 12.

FIG. 17 shows the magnitude response of the magnitude equalizer of the baseband processor of FIG. 12. It is apparent that the magnitude equalizer "pre-distorts" the transmit signal according to the inverse of the PLL signal filter, at least up to a few hundred kHz. Notice that frequencies beyond this represent a "don't care" region of the equalizer since the transmit signal has no energy in this region.

Figure 18:
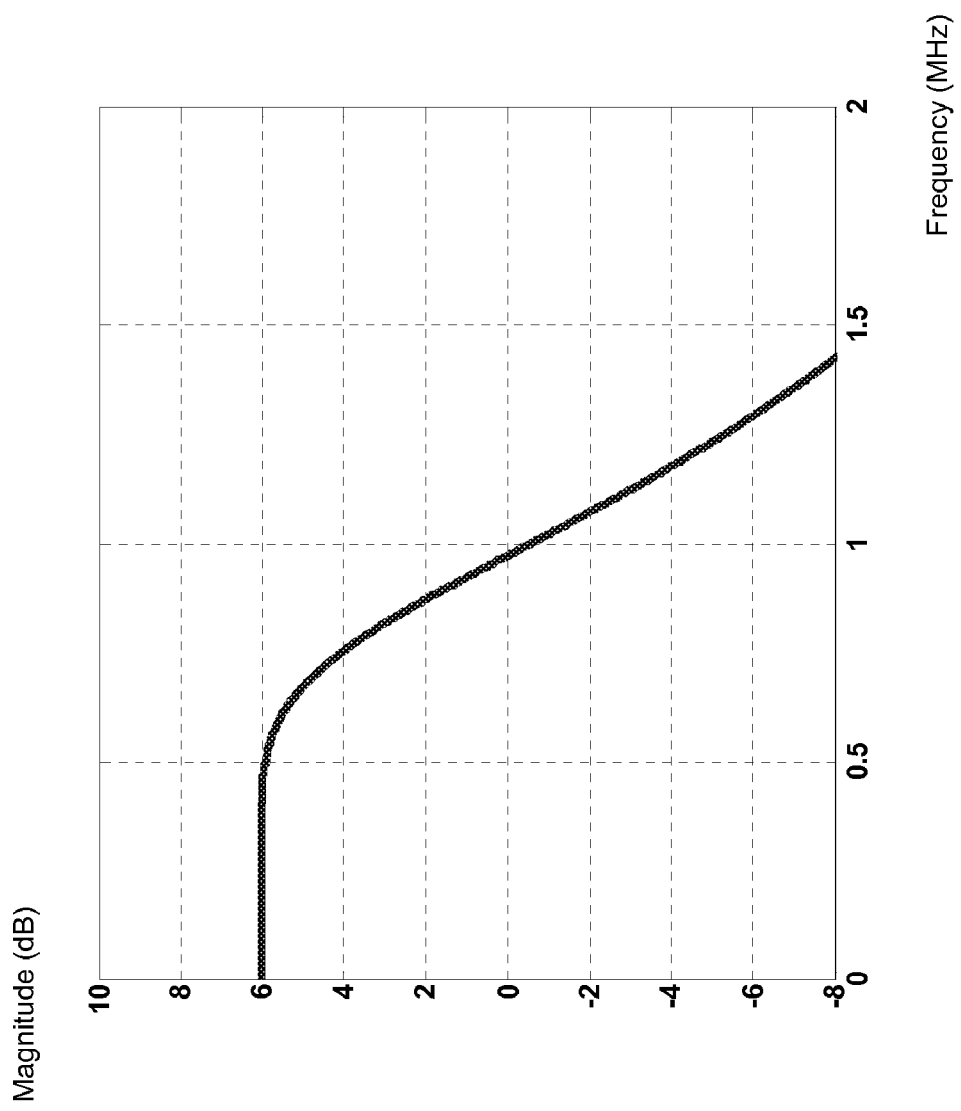
FIG. 18 shows the magnitude response of the cascade of magnitude equalizer and PLL signal filter.

FIG. 18 shows the magnitude response of the cascade of magnitude equalizer and PLL signal filter.

Figure 19:
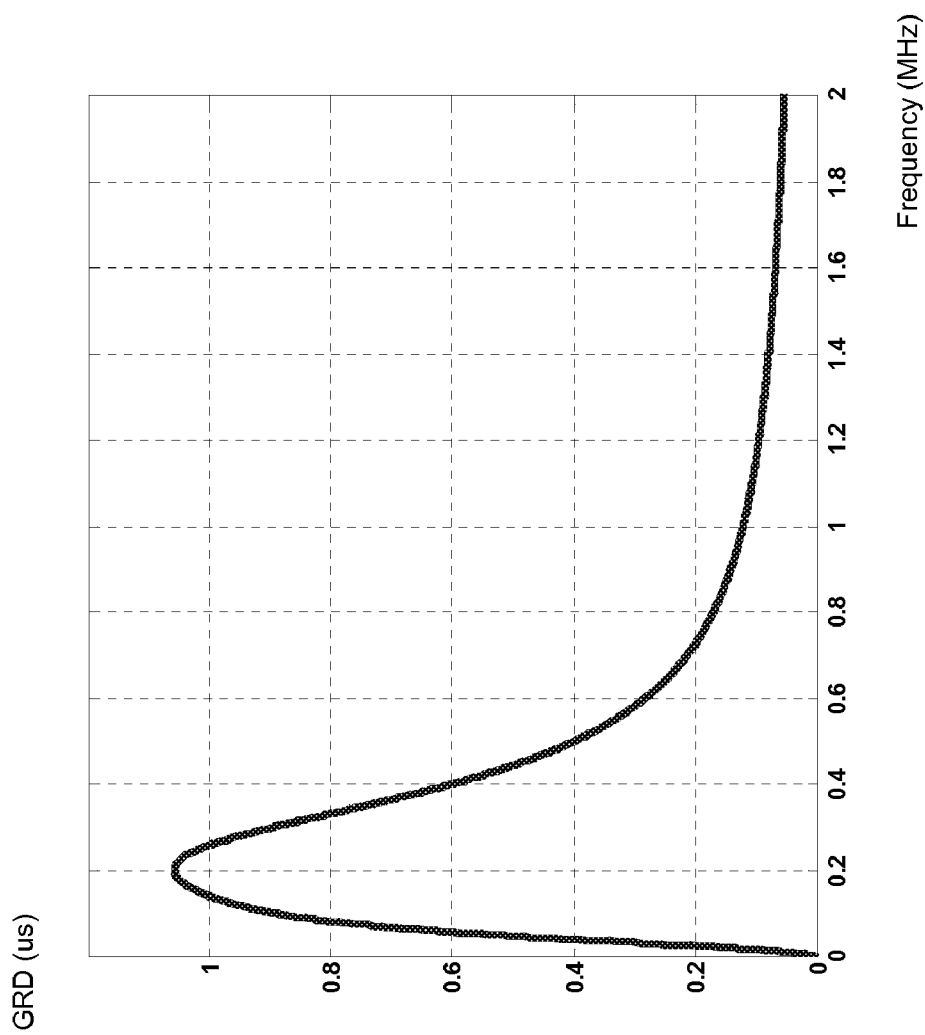
FIG. 19 shows the group delay response of the PLL signal filter of the translational loop RF transmitter designed in accordance with the present invention.

FIG. 19 shows the group delay response of the PLL signal filter of the translational loop RF transmitter designed in accordance with the present invention.

Figure 20:
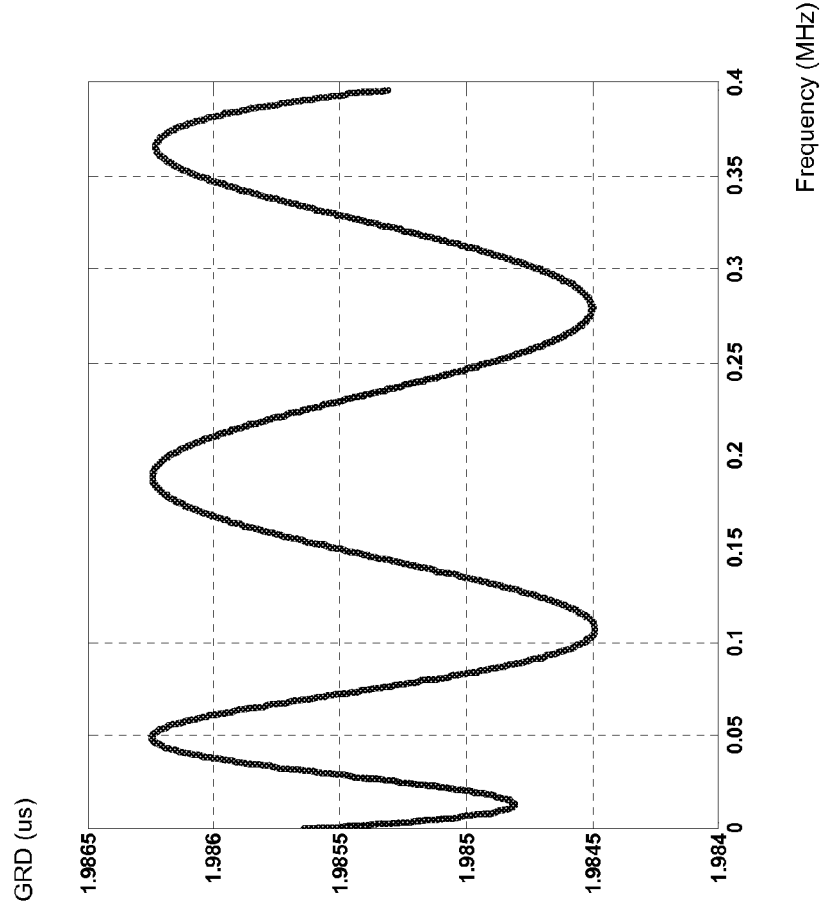
FIG. 20 shows the group delay response of the cascade of magnitude equalizer, group delay equalizer, and PLL signal filter.

FIG. 20 shows the group delay response of the cascade of magnitude equalizer, group delay equalizer, and PLL signal filter. Clearly, aside from some minimal ripple, the group delay is constant over the signal band and hence represents filtering with effectively linear phase response.

Both equalizers demonstrated here are implemented as $4^{th}$ order infinite impulse response (IIR) filters, i.e., they are digital filters with transfer functions of the form $$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}}.$$

Figure 21:
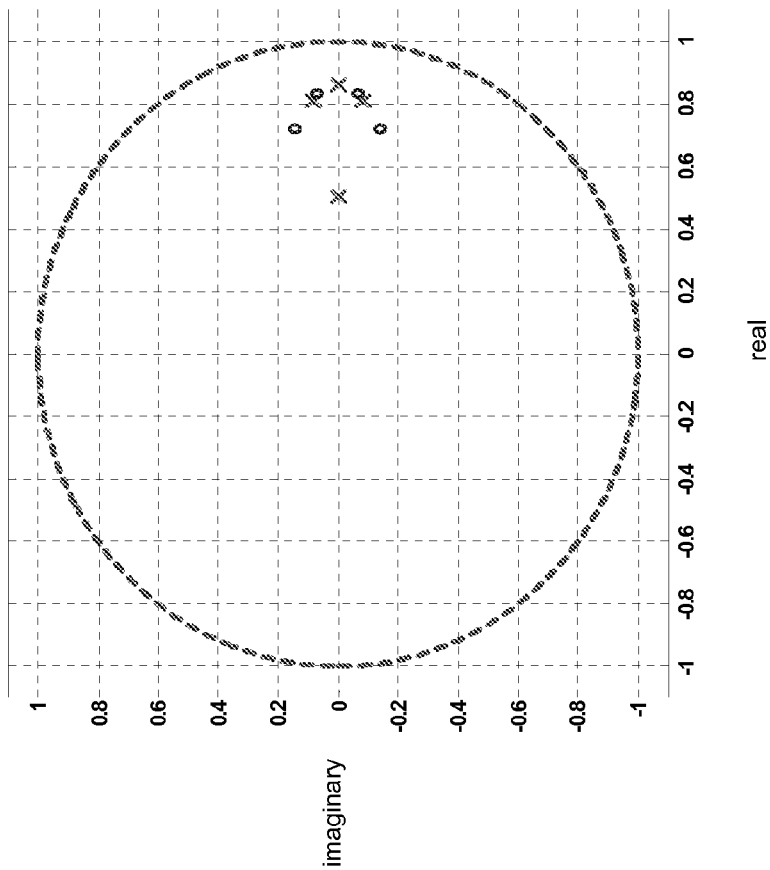
FIGS. 21 and 22 show the pole/zero plots corresponding to the magnitude and group delay equalizer, respectively.
Figure 22:
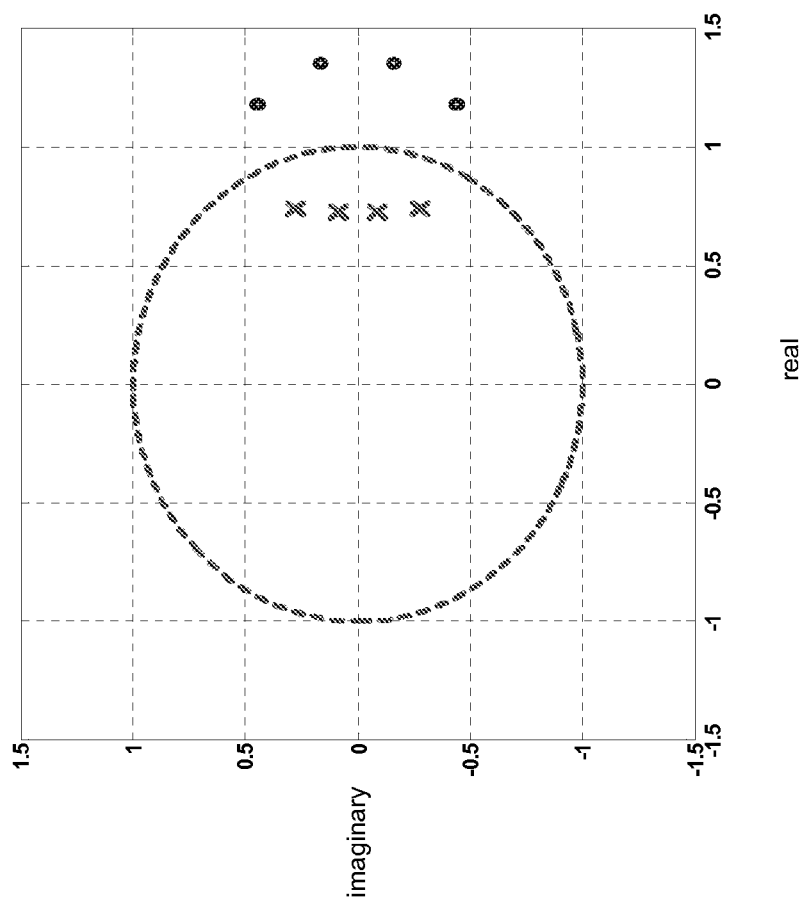
Figure 23:
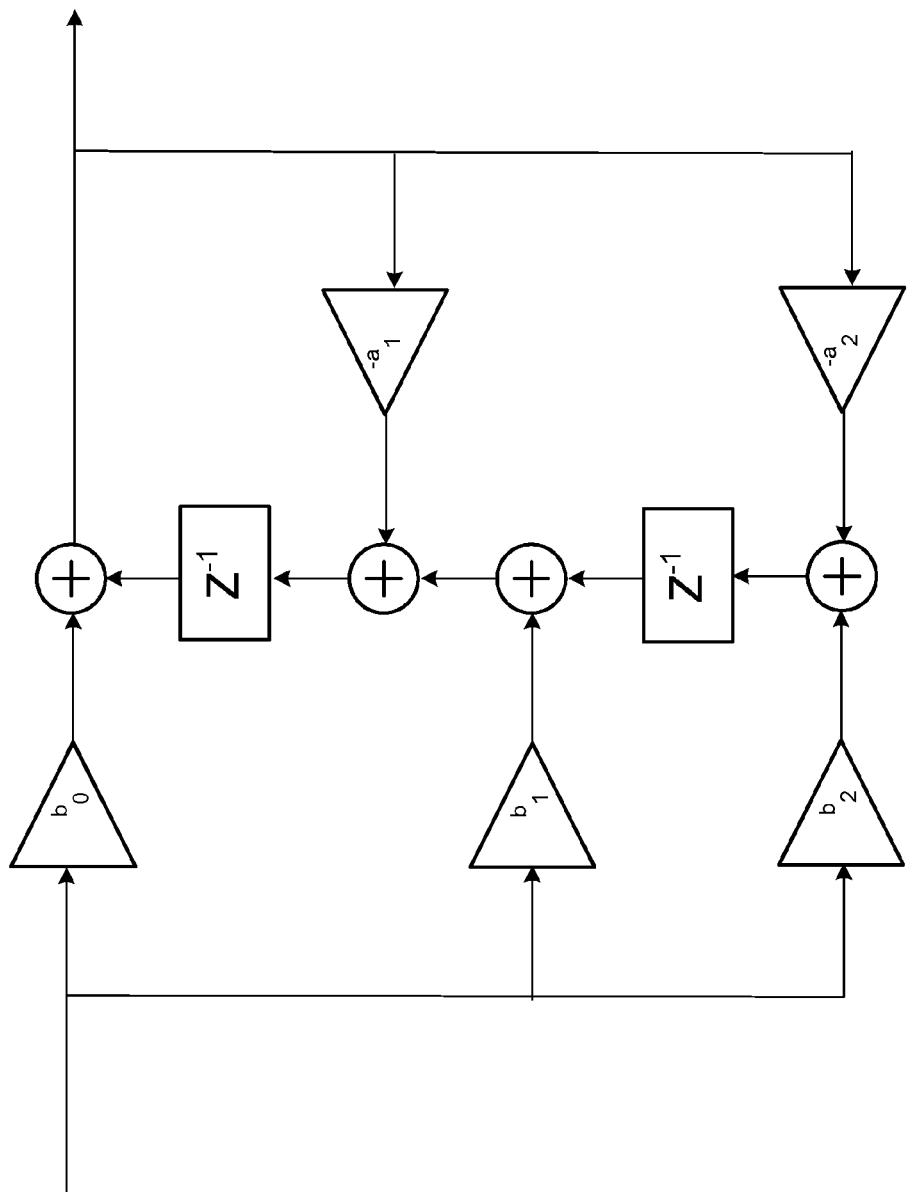
FIG. 23 illustrates a general bi-quad structure.

FIGS. 21 and 22 show the pole/zero plots corresponding to the magnitude and group delay equalizer, respectively. As $4^{th}$ order IIR filters, each filter can be implemented as a cascade of 2 bi-quads. A general bi-quad structure is shown in FIG. 23. While IIR filters are typically the preferred way to obtain equalization in the baseband processor, it should be mentioned that, in principle, any type of filters that provide the desired equalization functions would be applicable in the present invention.

Figure 24:
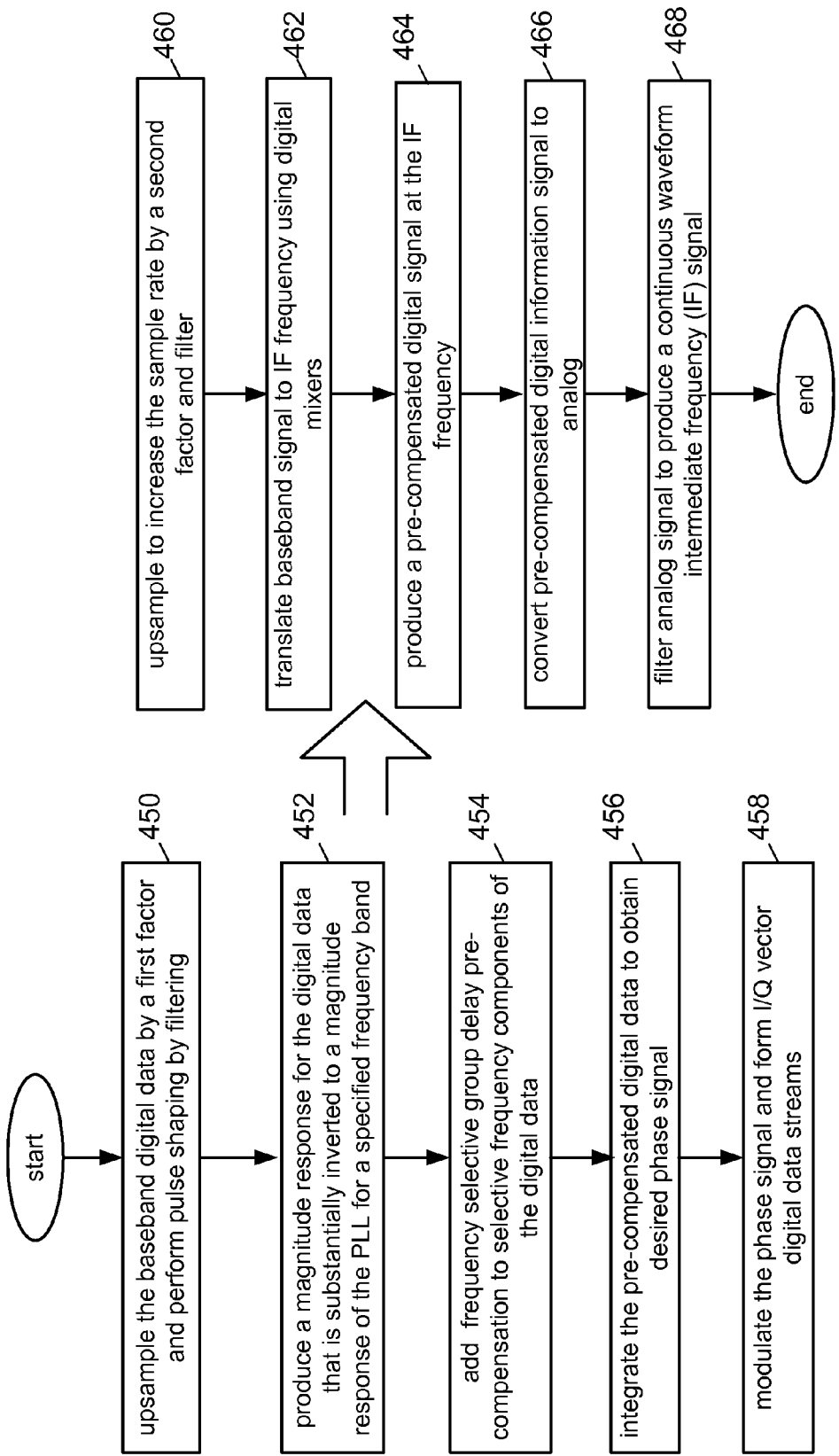
FIG. 24 is a flowchart illustrating one method of the present invention.

FIG. 24 is a flowchart illustrating one method of the present invention. A radio transmitter includes a digital processor that upsamples the digital data and performs pulse shaping by appropriate filtering (step 450). As has been described herein, the method further includes producing a magnitude response for the digital data that is substantially inverted to a magnitude response of the PLL for a specified frequency band (step 452). Additionally, a digital processor of the inventive radio transmitter adds frequency selective group delay pre-compensation to selective frequency components of the digital data (step 454). The digital processor then integrates then pre-compensated digital data to generate the desired phase signal (step 456). Thereafter, the invention modulates the phase signal and forms corresponding I & Q vector digital data streams (step 458). Each of the I & Q vector digital data streams are then upsampled to increase the sample rate by a second factor and then is filtered (step 460). Thereafter, the I & Q digital data is digitally modulated to a desired IF frequency using digital mixers (step 462) and a pre-compensated digital information signal at the desired IF is produced (step 464). Thereafter, the invention includes converting pre-compensated digital information signal to a continuous waveform (analog signal) (step 466) and is filtered to produce a continuous waveform intermediate frequency (IF) signal (step 468).

Figure 27:
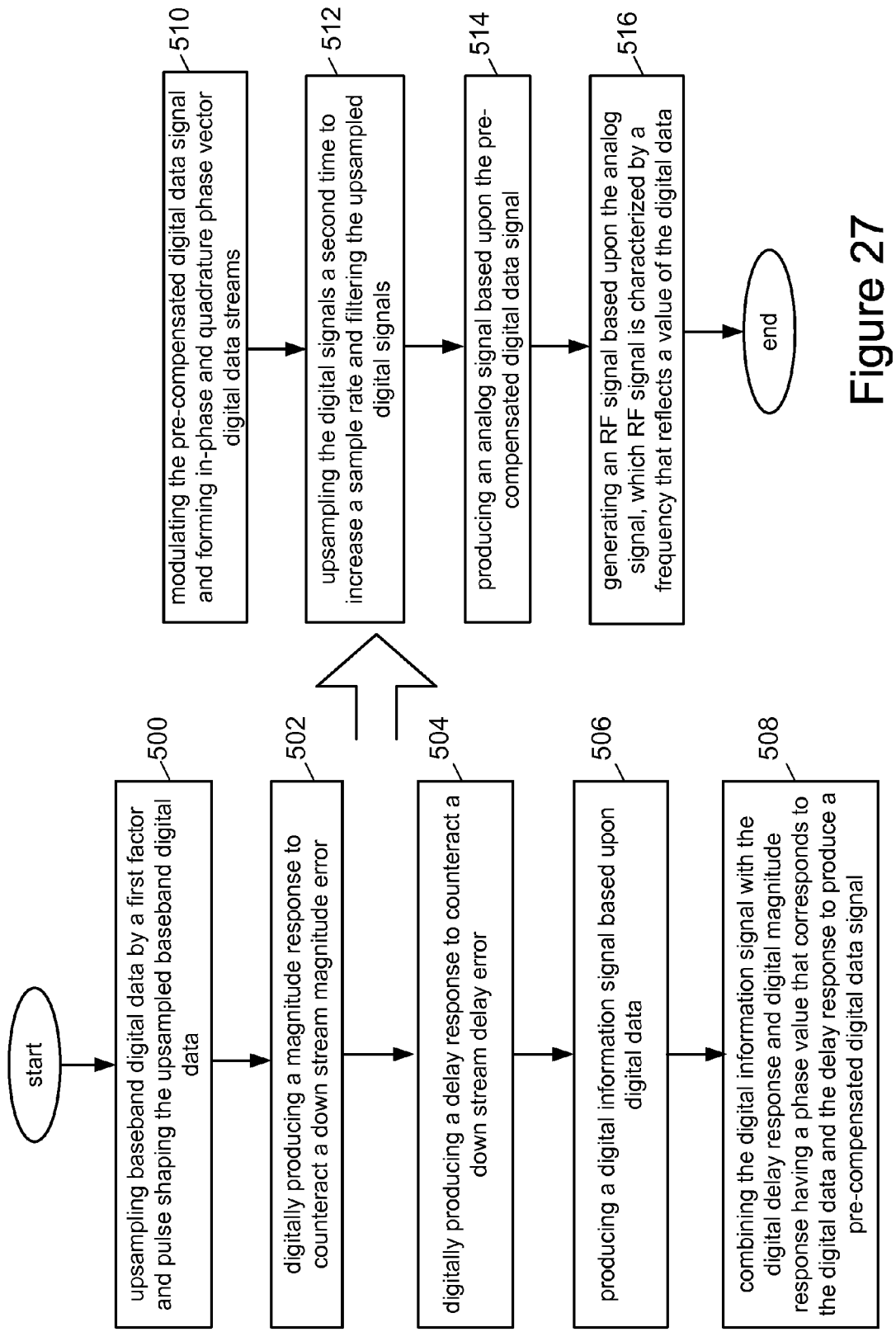

FIGS. 25-27 are flowcharts illustrating various method steps according to various embodiments of the present invention. Generally, steps 470-476 of FIG. 25 and steps 480-488 of FIG. 26 describe method steps for generating an analog signal while steps 500-516 of F*igure* 27 describes method steps for producing a pre-compensated digital data signal and subsequently generating an RF signal.

The embodiments of the present invention employ digital signal processing in the baseband processor to eliminate the modulation error problems caused by narrow PLL signal filters in the prior art. This satisfies a need for an architecture in which the PLL signal filter can be made narrower than in prior art while not significantly degrading transmitter modulation performance in order to satisfy strict IF feed through requirements such as for GSM cellular telephony. Specifically, the transmit signal generated by the baseband processor is "pre-distorted" to counter act the distortion imposed by a narrow PLL signal filter. This "pre-distortion", or equalization process, occurs in two steps: a magnitude equalizer filter in the baseband processor pre-distorts the amplitude of the transmit signal according to the inverse of the PLL signal filter magnitude response, and a group delay equalizer filter linearizes the phase response of the entire transmitter chain, i.e., pre-distorts the transmit signal such that the combined phase response of magnitude equalizer, group delay equalizer, and PLL signal filter is linear. The result is a translational loop transmitter that allows for a narrow PLL signal filter while providing high modulation accuracy.

Due to the properties of the PLL (translational loop), the PLL has both frequency selective magnitude response and frequency selective phase response. Thus, one aspect of the invention introduces frequency selective magnitude pre-compensation in the BBP ("PLL Magnitude Equalizer"). The other aspect of the invention introduces frequency selective phase pre-compensation in the BBP ("TX Chain Group Delay Equalizer"). This pre-compensation is intended to, in combination with the PLL response, produce a system response that is flat in both magnitude and phase. The nominal result is that the RF transmit signal has perfect form.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A method in a transceiver, comprising:
   comparing an analog signal that includes phase information and error pre-compensation information to a reference signal;
   generating an oscillation based upon the comparison; and
   down converting the oscillation to create the reference signal and producing the reference signal for the comparison step.

2. The method of claim 1 further including generating a digital information signal that includes pre-compensation for magnitude distortion of a narrow loop filter in a phase locked loop of the transceiver.

3. The method of claim 2 wherein the pre-compensated digital information signal is a digital IF signal having a bandwidth in the range of 200 kHz to 300 kHz.

4. The method of claim 1 further including generating a digital information signal that includes pre-compensation for phase distortion of a narrow loop filter in a phase locked loop of the transceiver.

5. The method of claim 4 wherein the pre-compensated digital information signal is a digital baseband signal.

6. The method of claim 1 wherein the transceiver is operable to produce a GSM signal.

7. A method in a transceiver, comprising:
   comparing an upconverted analog signal that includes phase information and error pre-compensation information to a reference signal produced by a reference signal generator;
   generating an oscillation based upon the comparison;
   down converting the oscillation to create an upconversion mixer signal;
   producing the upconversion mixer signal to a mixer; and
   mixing the upconversion mixer signal with an analog signal contain information and pre-compensation components to create the upconverted analog signal that includes phase information and error pre-compensation information.

8. The method of claim 7 further including generating a digital information signal that includes pre-compensation for magnitude distortion of a narrow loop filter in a phase locked loop of the transceiver.

9. The method of claim 7 wherein the pre-compensated digital information signal is a digital IF signal having a bandwidth in the range of 200 kHz to 300 kHz.

10. The method of claim 7 further including generating a digital information signal that includes pre-compensation for phase distortion of a narrow loop filter in a phase locked loop of the transceiver.

11. The method of claim 10 wherein the pre-compensated digital information signal is a digital baseband signal.

12. The method of claim 7 wherein the transceiver is operable to produce a GSM signal.

13. A method in a transceiver, comprising:
   digitally producing a magnitude response to counteract a down stream magnitude error;
   digitally producing a delay response to counteract a down stream delay error;
   producing a digital information signal based upon digital data;
   combining the digital information signal with the digital delay response and digital magnitude response having a phase value that corresponds to the digital data and the delay response to produce a pre-compensated digital data signal;
   producing an analog signal based upon the pre-compensated digital data signal; and
   generating an RF signal based upon the analog signal, which RF signal is characterized by a frequency that reflects a value of the digital data.

14. The method of claim 13 further including upsampling baseband digital data by a first factor and pulse shaping the upsampled baseband digital data.

15. The method of claim 13 wherein the combining step includes integrating the digital information signal with the delay response and magnitude response.

16. The method of claim 13 further including modulating the pre-compensated digital data signal and forming in-phase and quadrature phase vector digital data streams.

17. The method of claim 13 further including upsampling the digital signals a second time to increase a sample rate and filtering the upsampled digital signals.

18. The method of claim 13 further including digitally mixing the pre-compensated digital data signal to create an intermediate frequency pre-compensated digital data signal.

19. The method of claim 13 wherein generating an RF signal includes generating a radio frequency oscillation having a frequency that reflects a digital data value based upon an analog form of the pre-compensated digital data signal.

20. The method of claim 13 wherein the RF signal is a GSM compatible signal.

* * * * *